US010812153B1

(12) United States Patent
Chen et al.

(10) Patent No.: US 10,812,153 B1
(45) Date of Patent: *Oct. 20, 2020

(54) BEAM MEASUREMENT REPORTING METHOD, TERMINAL SIDE DEVICE AND NETWORK SIDE DEVICE

(71) Applicant: VIVO MOBILE COMMUNICATION CO., LTD., Chang'an Dongguan (CN)

(72) Inventors: Li Chen, Chang'an Dongguan (CN); Xiaodong Yang, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/887,234

(22) Filed: May 29, 2020

Related U.S. Application Data

(63) Continuation of application No. 16/490,355, filed as application No. PCT/CN2018/080014 on Mar. 22, 2018, now Pat. No. 10,707,926.

(30) Foreign Application Priority Data

Mar. 24, 2017 (CN) .......................... 2017 1 0184045

(51) Int. Cl.
*H04M 3/00* (2006.01)
*H04B 7/0408* (2017.01)
(Continued)

(52) U.S. Cl.
CPC ........... *H04B 7/0408* (2013.01); *H04B 7/022* (2013.01); *H04B 7/0617* (2013.01);
(Continued)

(58) Field of Classification Search
CPC .... H04B 7/0408; H04B 7/022; H04B 7/0617; H04B 7/0626; H04B 7/0632;
(Continued)

(56) References Cited

U.S. PATENT DOCUMENTS 9,191,957 B2 * 11/2015 Kim ...................... H04L 5/0051
9,252,853 B2 *  2/2016 Sajadieh ............... H04L 65/602
(Continued)

FOREIGN PATENT DOCUMENTS

CN          103547341 A      1/2014
CN          104221307 A     12/2014
(Continued)

OTHER PUBLICATIONS

1st Chinese Office Action for Chinese Application No. 201710184045. 2, dated Jun. 25, 2019 (dated Jun. 25, 2019)—16 pages (English translation—20 pages).
(Continued)

*Primary Examiner* — Mahendra R Patel
(74) *Attorney, Agent, or Firm* — Culhane Meadows PLLC; Stephen J. Weed

(57) ABSTRACT

The beam measurement reporting method provided by some embodiments of the present disclosure includes: acquiring measurement configuration information from the network side device; measuring, by the terminal side device in a connected state, a predetermined reference signal on a first predetermined quantity of transmission beams in accordance with the measurement configuration information; acquiring a measurement result of the predetermined reference signal on the first predetermined quantity of transmission beams; and performing a measurement reporting operation in accordance with the measurement result for the first predetermined quantity of transmission beams.

20 Claims, 8 Drawing Sheets

(51) Int. Cl.
*H04B 7/022* (2017.01)
*H04W 24/10* (2009.01)
*H04B 7/06* (2006.01)

(52) U.S. Cl.
CPC ......... *H04B 7/0626* (2013.01); *H04B 7/0632* (2013.01); *H04W 24/10* (2013.01)

(58) Field of Classification Search
CPC ...... H04B 7/0482; H04B 7/0417; H04B 7/06; H04L 5/00; H04L 5/0048; H04L 5/0082; H04W 24/10; H04W 16/28; H04W 72/04; H04W 24/08; H04W 72/12
USPC ............ 455/418, 452.2, 452.1; 370/342, 252
See application file for complete search history.

(56) References Cited

U.S. PATENT DOCUMENTS

| | | | | |
|---|---|---|---|---|
| 9,520,973 | B2* | 12/2016 | Kim | H04L 5/0048 |
| 10,051,485 | B2* | 8/2018 | Wang | H04W 72/046 |
| 2009/0196272 | A1* | 8/2009 | Tsutsui | H04B 7/0639 |
| | | | | 370/342 |
| 2011/0275361 | A1* | 11/2011 | Yavuz | H04W 52/244 |
| | | | | 455/422.1 |
| 2012/0082052 | A1* | 4/2012 | Oteri | H04W 24/10 |
| | | | | 370/252 |
| 2013/0059619 | A1* | 3/2013 | Kim | H04B 7/063 |
| | | | | 455/509 |
| 2013/0196675 | A1* | 8/2013 | Xiao | H04B 17/309 |
| | | | | 455/452.1 |
| 2013/0286867 | A1* | 10/2013 | Davydov | H04W 24/08 |
| | | | | 370/252 |
| 2014/0323144 | A1* | 10/2014 | Kim | H04B 7/0408 |
| | | | | 455/452.1 |
| 2016/0241322 | A1* | 8/2016 | Son | H04W 72/046 |
| 2017/0150487 | A1* | 5/2017 | Zhou | H04B 7/0626 |
| 2017/0195027 | A1* | 7/2017 | Baek | H04L 5/0048 |
| 2017/0208494 | A1* | 7/2017 | Moon | H04L 5/0048 |
| 2018/0146389 | A1* | 5/2018 | Nagata | H04W 24/08 |
| 2019/0327629 | A1* | 10/2019 | Zhang | H04B 7/0626 |
| 2019/0364451 | A1* | 11/2019 | Yang | H04W 24/10 |

FOREIGN PATENT DOCUMENTS

| | | | | |
|---|---|---|---|---|
| CN | 106301505 | A | | 1/2017 |
| CN | 106488472 | A | | 3/2017 |
| CN | 107896388 | A | * | 4/2018 ........... H04W 24/08 |
| EP | 2999133 | A1 | | 3/2016 |
| WO | 2014194525 | A1 | | 12/2014 |
| WO | WO-2014194525 | A1 | * | 12/2014 .............. H04B 7/04 |
| WO | 2015080648 | A1 | | 6/2015 |
| WO | 2015109153 | A1 | | 7/2015 |
| WO | 2016018121 | A1 | | 2/2016 |
| WO | 2016023227 | A1 | | 2/2016 |
| WO | 2017039505 | A1 | | 3/2017 |

OTHER PUBLICATIONS

Extended European Search Report for European Application No. 18770666.8, dated Mar. 11, 2020 (dated Mar. 11, 2020)—9 pages.
International Search Report and Written Opinion for International Application No. PCT/CN2018/080014, dated Oct. 3, 2019 (dated Oct. 3, 2019)—9 pages (English translation—5 pages).
LTE Advanced: Technical Specification Group Radio Access Network; Evolved Universal Terrestrial Radio Acces (E-UTRA); Radio Resource Control (RRC); Protocol specification (Release 12); 3GPP TS 36.331 v12. 12.0, Sophia Antiplis Valbonne, France, Dec. 2016, 402 pages.
Nokia, Alcatel-Lucent Shanghai Bell: "Beam Management—Beam Reporting" R1-1703162, 3GPP TSG-RAN WG1#88, Athens, Greece, Feb. 13, 2017, 5 pages.

* cited by examiner

BEAM MEASUREMENT REPORTING METHOD, TERMINAL SIDE DEVICE AND NETWORK SIDE DEVICE

CROSS-REFERENCE TO RELATED APPLICATION

This application is a continuation of U.S. patent application Ser. No. 16/490,355 filed on Aug. 30, 2019, which is the U.S. national phase of PCT Application No. PCT/CN2018/080014 filed on Mar. 22, 2018, which claims the priority of the Chinese patent application 201710184045.2 filed on Mar. 24, 2017, each of which is incorporated by reference herein in its entirety.

TECHNICAL FIELD

The present disclosure relates to the field of communication technology, in particular to a beam measurement reporting method, a terminal side device, and a network side device.

BACKGROUND

High-frequency beam-forming and thereby a multiple-beam scenario have been introduced into a $5^{th}$-Generation (5G) system. Trigger events A1-A6, B1-B2, C1-C2 and W1-W3 for measurement reporting have been defined in a conventional Long Term Evolution (LTE) technique. However, how to perform the measurement reporting in accordance with multiple-beam measurement as well as relevant trigger events have not been involved in the conventional LTE technique or in the relevant discussion, nor disclosed in the subsequent improved technique.

Hence, there is an urgent need to provide a scheme for multiple-beam measurement reporting.

SUMMARY

An object of the present disclosure is to provide a beam measurement reporting method, a terminal side device and a network side device, so as to achieve the multiple-beam measurement reporting.

In one aspect, the present disclosure provides in some embodiments a beam measurement reporting method for a terminal side device, including: acquiring measurement configuration information from a network side device; determining a first predetermined quantity of transmission beams in a plurality of transmission beams in accordance with the measurement configuration information, the first predetermined quantity of transmission beams being transmission beams to be adopted by the terminal side device in a connected state to perform predetermined reference signal measurement; acquiring a measurement result of a predetermined reference signal on the first predetermined quantity of transmission beams; and performing a measurement reporting operation in accordance with the measurement result of the predetermined reference signal on the first predetermined quantity of transmission beams.

In another aspect, the present disclosure provides in some embodiments a terminal side device, including: a first acquisition module configured to acquire measurement configuration information from a network side device; a determination module configured to determine a first predetermined quantity of transmission beams in a plurality of transmission beams in accordance with the measurement configuration information, the first predetermined quantity of transmission beams being transmission beams to be adopted by the terminal side device in a connected state to perform predetermined reference signal measurement; a second acquisition module configured to acquire a measurement result of a predetermined reference signal on the first predetermined quantity of transmission beams; and a measurement reporting module configured to perform a measurement reporting operation in accordance with the measurement result of the predetermined reference signal on the first predetermined quantity of transmission beams.

In yet another aspect, the present disclosure provides in some embodiments a beam measurement reporting method for a network side device, including transmitting measurement configuration information to a terminal side device, so as to enable the terminal side device to determine a first predetermined quantity of transmission beams in a plurality of transmission beams in accordance with the measurement configuration information, acquire a measurement result of a predetermined reference signal on the first predetermined quantity of transmission beams, and perform a measurement reporting operation in accordance with the measurement result of the predetermined reference signal on the first predetermined quantity of transmission beams.

In still yet another aspect, the present disclosure provides in some embodiments a network side device, including a first transmission module configured to transmit measurement configuration information to a terminal side device, so as to enable the terminal side device to determine a first predetermined quantity of transmission beams in a plurality of transmission beams in accordance with the measurement configuration information, acquire a measurement result of a predetermined reference signal on the first predetermined quantity of transmission beams, and perform a measurement reporting operation in accordance with the measurement result of the predetermined reference signal on the first predetermined quantity of transmission beams.

In still yet another aspect, the present disclosure provides in some embodiments a terminal side device, including a processor, a memory, and a computer program stored in the memory and executed by the processor. The processor is configured to execute the computer program, so as to implement the above-mentioned beam measurement reporting method.

In still yet another aspect, the present disclosure provides in some embodiments a computer-readable storage medium storing therein a computer program. The computer program is executed by a processor so as to implement the above-mentioned beam measurement reporting method.

In still yet another aspect, the present disclosure provides in some embodiments a network side device, including a processor, a memory, and a computer program stored in the memory and executed by the processor. The processor is configured to execute the computer program, so as to implement the above-mentioned beam measurement reporting method.

In still yet another aspect, the present disclosure provides in some embodiments a computer-readable storage medium storing therein a computer program. The computer program is executed by a processor so as to implement the above-mentioned beam measurement reporting method.

According to embodiments of the present disclosure, the terminal side device may acquire the measurement configuration information from the network side device, determine the first predetermined quantity of transmission beams in the plurality of transmission beams in accordance with the measurement configuration information (the first predetermined quantity of transmission beams may be transmission beams to be adopted by the terminal side device in the connected state to perform the predetermined reference signal measurement), acquire the measurement result of the predetermined reference signal on the first predetermined quantity of transmission beams, and perform the measurement reporting operation in accordance with the measurement result of the predetermined reference signal on the first predetermined quantity of transmission beams. As a result, it is able to achieve the multiple-beam measurement reporting, i.e., to perform the measurement reporting operation in a multiple-beam scenario, thereby to improve the network performance.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
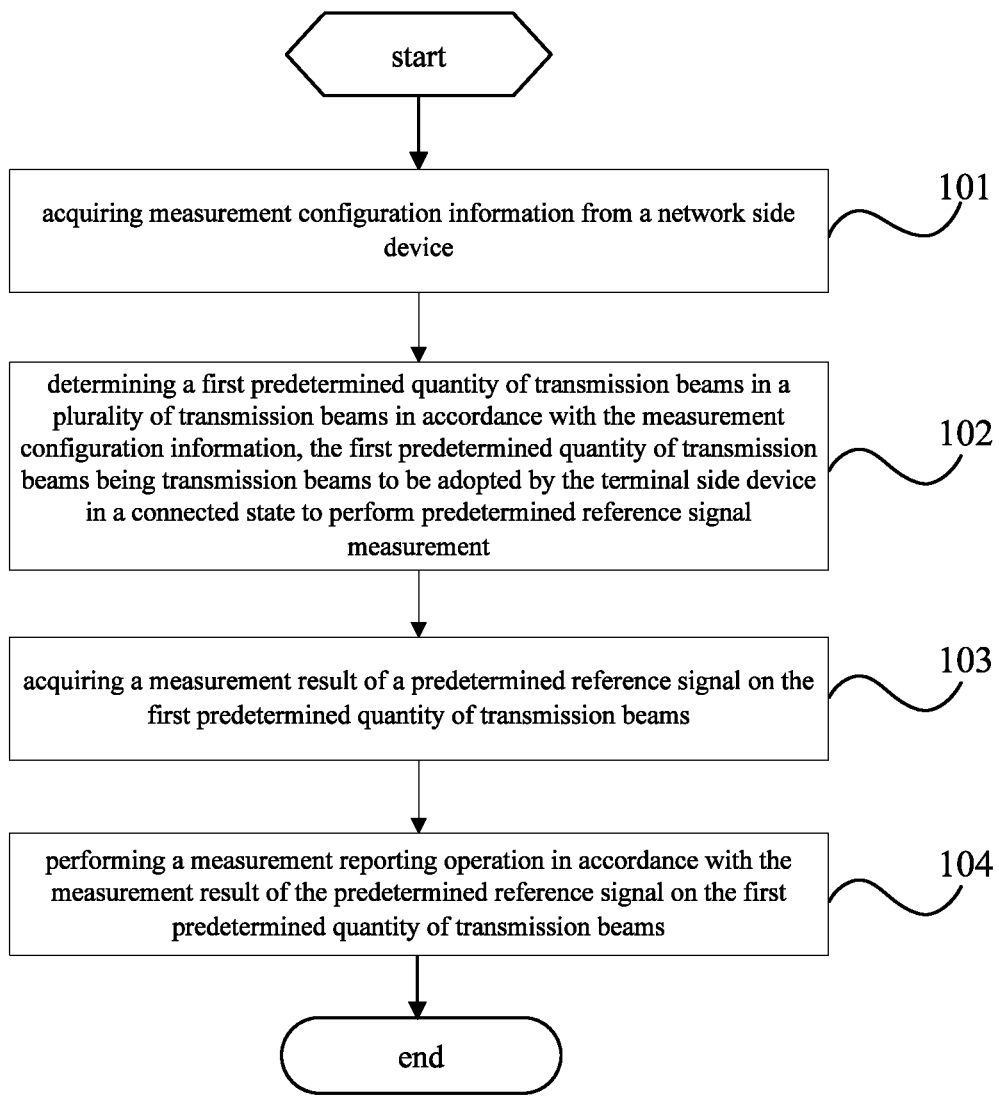
FIG. 1 is a flow chart of a beam measurement reporting method for a terminal side device according to some embodiments of the present disclosure.

The present disclosure provides in some embodiments a beam measurement reporting method for a terminal side device which, as shown in FIG. 1, includes the following steps.

Step 101: acquiring measurement configuration information from a network side device.

Here, the measurement configuration information may be acquired from the network side device, so as to facilitate the subsequent determination of the quantity of to-be-measured beams in a plurality of transmission beams.

Step 102: determining a first predetermined quantity of transmission beams in the plurality of transmission beams in accordance with the measurement configuration information, the first predetermined quantity of transmission beams being transmission beams to be adopted by the terminal side device in a connected state to perform predetermined reference signal measurement.

Here, the first predetermined quantity N1 (for ease of description, the first predetermined quantity may be represented by N1) of transmission beams on which predetermined reference signal measurement needs to be performed may be determined in the plurality of transmission beams accurately and rapidly for the terminal side device in a Radio Resource Control (RRC) connected state in accordance with the measurement configuration information, so as to facilitate the beam measurement in a multiple-beam scenario.

Step 103: acquiring a measurement result of a predetermined reference signal on the first predetermined quantity of transmission beams.

Here, the measurement result of the predetermined reference signal on the N1 transmission beams may be acquired in accordance with the determined N1 transmission beams, so as to measure the N1 transmission beams, thereby to perform the beam measurement in the multiple-beam scenario.

Step 104: performing a measurement reporting operation in accordance with the measurement result of the predetermined reference signal on the first predetermined quantity of transmission beams.

Here, the measurement result of the predetermined reference signal on the N1 transmission beams may be reported to the network side device, so as to perform the measurement reporting operation in the multiple-beam scenario.

According to the beam measurement reporting method in the embodiments of the present disclosure, it is able to perform the measurement reporting operation in the multiple-beam scenario, i.e., to solve the problem in a conventional LTE system where multiple-beam measurement reporting is unavailable, thereby to improve the network performance.

In a possible embodiment of the present disclosure, the measurement configuration information may include the quantity of to-be-measured beams configured by the network side device for the terminal side device.

Here, the network side device may configure the quantity Np1 of to-be-measured beams for the terminal side device (for ease of description, the quantity of the to-be-measured beams configured by the network side device for the terminal side device may be represented by Np1), so as to enable the terminal side device to determine the to-be-measured beams, thereby to facilitate the beam measurement in the multiple-beam scenario.

The network side device may configure several to-be-measured beams for a User Equipment (UE) through System Information (SI) or a dedicated RRC message (e.g., a reconfiguration message). In other words, the measurement configuration information may be included in the SI or the dedicated RRC message.

Step 102 may include, when the configured quantity of to-be-measured beams is smaller than a beam quantity measurement capability threshold of the terminal side device, determining the configured quantity of to-be-measured beams as the first predetermined quantity.

In the embodiments of the present disclosure, the terminal side device may determine the N1 transmission beams for the predetermined reference signal measurement in the plurality of transmission beams in accordance with Np1 and the beam quantity measurement capability threshold M of the terminal side device (for ease of description, the beam quantity measurement capability threshold of the terminal side device may be represented by M).

When Np1 is smaller than M, i.e., when the quantity of to-be-measured beams configured by the network side device for the terminal side device is smaller than the beam quantity measurement capability threshold of the terminal side device, the configured quantity of to-be-measured beams may be determined as the quantity of beams for the predetermined reference signal measurement in the plurality of transmission beams, i.e., N1=Np1. At this time, it is able to meet the network requirement.

When the quantity of to-be-measured beams configured by the network side device for the terminal side device is greater than or equal to the beam quantity measurement capability threshold of the terminal side device, the beam quantity measurement capability threshold of the terminal side device may be determined as the first predetermined quantity.

Here, when Np1 is greater than or equal to M, i.e., when the quantity of to-be-measured beams configured by the network side device for the terminal side device is greater than or equal to the beam quantity measurement capability threshold of the terminal side device, the beam quantity measurement capability threshold of the terminal side device may be determined as the quantity of beams for the predetermined reference signal measurement in the plurality of transmission beams, i.e., N1=M. At this time, it is able to meet the network requirement to the greatest extent without going beyond a current measurement capability.

At this time, the terminal side device may accurately determine the N1 transmission beams for the predetermined reference signal measurement in the plurality of transmission beams in accordance with the quantity Np1 of to-be-measured beams configured by the network side device for the terminal side device and the beam quantity measurement capability threshold M of the terminal side device.

Figure 2:
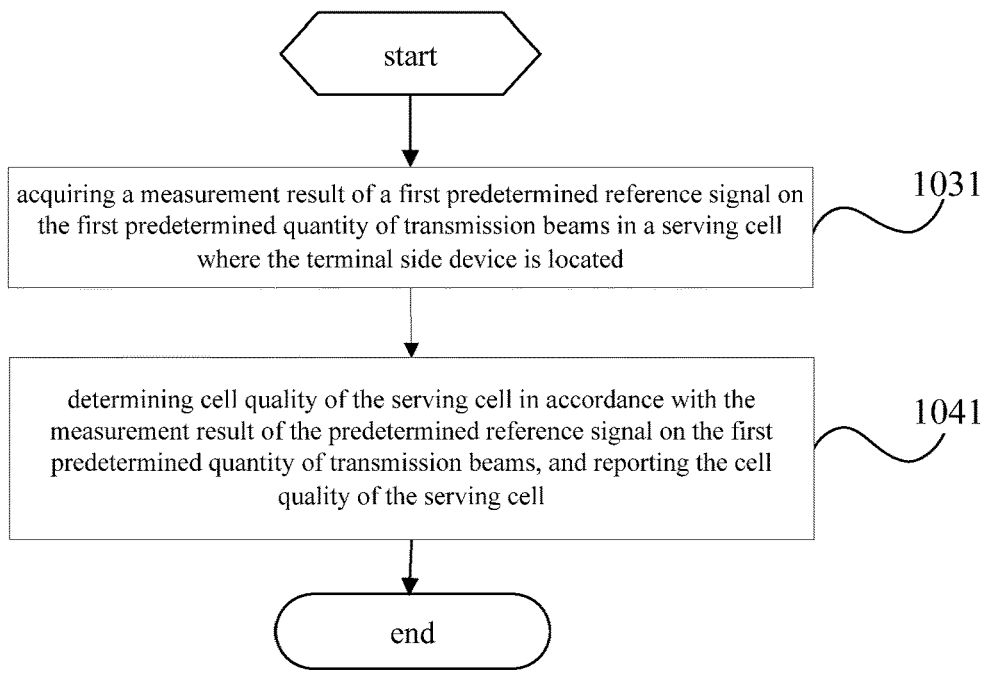
FIG. 2 is a flow chart of sub-steps of the beam measurement reporting method according to some embodiments of the present disclosure.
Figure 3:
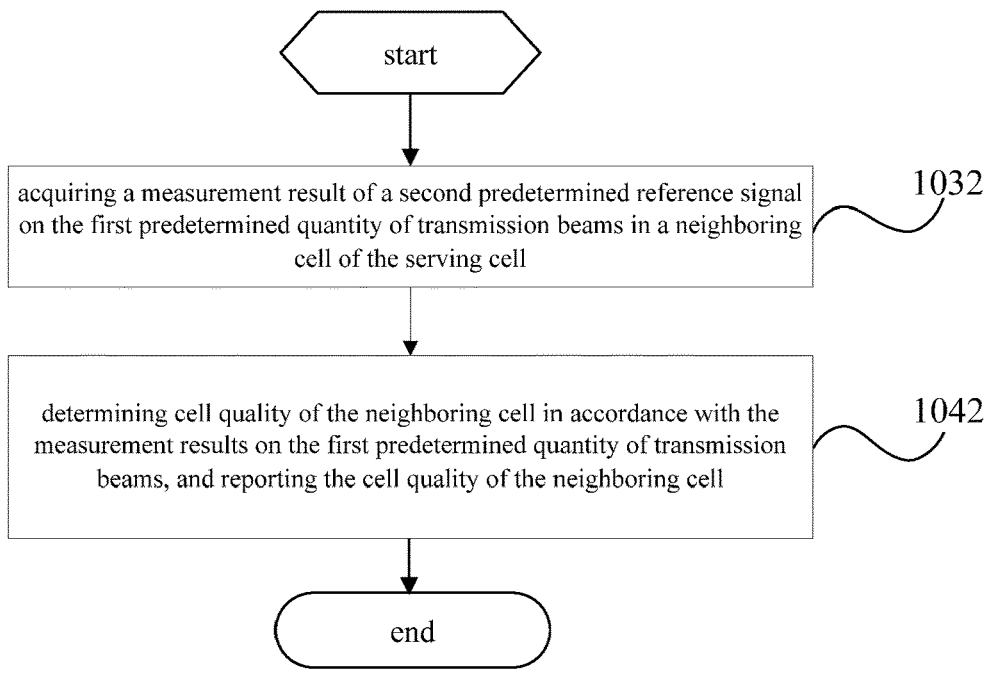
FIG. 3 is another flow chart of the sub-steps of the beam measurement reporting method according to some embodiments of the present disclosure.

In a possible embodiment of the present disclosure, as shown in FIG. 2 and FIG. 3, Step 103 may include Step 1031 and/or Step 1032.

Step 1031: acquiring a measurement result of a first predetermined reference signal on the first predetermined quantity of transmission beams in a serving cell where the terminal side device is located.

Here, the terminal side device may acquire the measurement result of the first predetermined reference signal on the N1 transmission beams in the serving cell, so as to facilitate the subsequent measurement reporting in the serving cell.

Step 1032: acquiring a measurement result of a second predetermined reference signal on the first predetermined quantity of transmission beams in a neighboring cell of the serving cell.

Here, the terminal side device may also acquire the measurement result of the second predetermined reference signal on the N1 transmission beams in the neighboring cell, so as to facilitate the subsequent measurement reporting in the neighboring cell.

At this time, the terminal side device may measure the transmission beams in the serving cell and/or the neighboring cell, so as to meet different requirements in different scenarios, thereby to further improve the network performance.

In the embodiments of the present disclosure, a single signal, e.g., xSS or Channel State Information (CSI)-Reference Signal (RS), may be measured on the N1 transmission beams in the serving cell, or two signals, e.g., xSS and CSI-RS, xSS and Demodulation Reference Signal (DMRS), or CSI-RS and DMRS, may be measured simultaneously on the N1 transmission beams in the serving cell, or three signals, e.g., xSS, CSI-RS and DMRS, may be measured simultaneously on the N1 transmission beams in the serving cell.

In other words, the first predetermined reference signal may include the synchronization signal xSS or the CSI-RS, or at least two of the xSS, the CSI-RS and the DMRS.

Identically, in the embodiments of the present disclosure, a single signal, e.g., xSS or CSI-RS, may be measured on the N1 transmission beams in the neighboring cell, or two signals, e.g., xSS and CSI-RS, xSS and DMRS, or CSI-RS and DMRS, may be measured simultaneously on the N1 transmission beams in the neighboring cell, or three signals, e.g., xSS, CSI-RS and DMRS, may be measured simultaneously on the N1 transmission beams in the neighboring cell.

In other words, the second predetermined reference signal may include the synchronization signal xSS or the CSI-RS, or at least two of the xSS, the CSI-RS and the DMRS.

In the embodiments of the present disclosure, the first predetermined reference signal may be the same as, or different from, the second predetermined reference signal.

The xSS may include a secondary synchronization signal (SSS), or include a primary synchronization signal (PSS) and the SSS.

In a possible embodiment of the present disclosure, the measurement result may include at least one of Reference Signal Received Power (RSRP), Reference Signal Received Quality (RSRQ) and a Reference Signal-Signal to Interference plus Noise Ratio (RS-SINR).

At this time, the RSRP and/or the RSRQ and/or the RS-SINR of the predetermined reference signal may be measured on the N1 transmission beams in the serving cell and/or the neighboring cell, so as to acquire values of the RSRP and/or RSRQ and/or RS-SINR.

In a possible embodiment of the present disclosure, as shown in FIG. 2, when Step 103 includes Step 1031, Step 104 may include Step 1041 of determining cell quality of the serving cell in accordance with the measurement result of the predetermined reference signal on the first predetermined quantity of transmission beams, and reporting the cell quality of the serving cell.

At this time, after the acquisition of the measurement result of the predetermined reference signal on the N1 transmission beams in the serving cell, the cell quality of the serving cell may be determined accurately in accordance with the measurement result, and then the cell quality of the serving cell may be reported to the network side device for subsequent use. In this way, it is able to report the cell quality in the multiple-beam scenario, thereby to further improve the network performance.

To be specific, Step 1041 may include acquiring a measurement result of a currently-serving transmission beam from the measurement result of the predetermined reference signal on the first predetermined quantity of transmission beams, and determine the cell quality of the serving cell in accordance with the measurement result of the currently-serving transmission beam.

Here, the terminal side device may acquire the measurement result of the currently-serving transmission beam in the measurements results for the N1 transmission beams in the serving cell, and accurately determine the cell quality of the serving cell in accordance with the measurement result of the currently-serving transmission beam.

Alternatively, Step 1041 may include calculating the measurement results on the first predetermined quantity of transmission beams in accordance with a predetermined algorithm, and determining the cell quality of the serving cell in accordance with a calculation result.

Here, the terminal side device may calculate the measurement results on the N1 transmission beams in the serving cell in accordance with the predetermined algorithm, e.g., a summation, averaging or weighting algorithm, and accurately determine the cell quality of the serving cell in accordance with the calculation result.

Alternatively, Step 1041 may include acquiring measurement results on transmission beams of a first type greater than a first predetermined threshold in the measurement results on the first predetermined quantity of transmission beams, calculating the measurement results on the transmission beams of the first type in accordance with the predetermined algorithm, and determine the cell quality of the serving cell in accordance with the calculation result.

Here, the terminal side device may acquire the measurement results on the transmission beams of the first type greater than the first predetermined threshold in the measurement results on the N1 transmission beams in the serving cell, calculating the measurement results on the transmission beams of the first type in accordance with the predetermined algorithm, e.g., a summation, averaging or weighting algorithm, and accurately determine the cell quality of the serving cell in accordance with the calculation result.

As mentioned hereinabove, the predetermined algorithm may include a summation, averaging or weighting algorithm.

The first predetermined threshold may be predefined, or configured through the SI or the dedicated RRC message.

The cell quality of the serving cell may be accurately determined in the above-mentioned three ways, which may be selected by the terminal side device according to the practical need.

In a possible embodiment of the present disclosure, as shown in FIG. 3, when Step 103 includes Step 1032, Step 104 may include Step 1042 of determining cell quality of the neighboring cell in accordance with the measurement results on the first predetermined quantity of transmission beams, and reporting the cell quality of the neighboring cell.

At this time, after the acquisition of the measurement results on the N1 transmission beams in the neighboring cell, the terminal side device may accurately determine the cell quality of the neighboring cell in accordance with the measurement results on the N1 transmission beams, and report the cell quality of the neighboring cell to the network side device for subsequent use. In this way, it is able to report the cell quality in the multiple-beam scenario, thereby to further improve the network performance.

To be specific, Step 1042 may include calculating the measurement results on the first predetermined quantity of transmission beams in accordance with a predetermined algorithm, and determining the cell quality of the neighboring cell in accordance with a calculation result.

Here, the terminal side device may calculate the measurement results on the N1 transmission beams in the neighboring cell in accordance with the predetermined algorithm, e.g., a summation, averaging or weighting algorithm, and accurately determine the cell quality of the neighboring cell in accordance with the calculation result.

Alternatively, Step 1042 may include acquiring measurement results on transmission beams of a second type greater than a first predetermined threshold in the measurement results on the first predetermined quantity of transmission beams, calculating the measurement results on the transmission beams of the second type in accordance with the predetermined algorithm, and determining the cell quality of the neighboring cell in accordance with the calculation result.

Here, the terminal side device may acquire the measurement results on the transmission beams of the second type greater than the first predetermined threshold in the measurement results on the N1 transmission beams in the neighboring cell, calculate the measurement results on the transmission beams of the second type in accordance with the predetermined algorithm, e.g., a summation, averaging or weighting algorithm, and accurately determine the cell quality of the neighboring cell in accordance with the calculation result.

As mentioned hereinabove, the predetermined algorithm may include a summation, averaging or weighting algorithm.

The first predetermined threshold may be predefined, or configured through the SI or the dedicated RRC message.

At this time, the cell quality of the neighboring cell may be accurately determined in the above-mentioned two ways, which may be selected by the terminal side device according to the practical need.

Based on the above, the terminal side device may accurately determine the cell quality of the serving cell and/or the neighboring cell in accordance with the measurement results on the N1 transmission beams in the serving cell and/or the neighboring cell, so as to report the cell quality in the multiple-beam scenario. In the embodiments of the present disclosure, the terminal side device may further report the measurement results on the transmission beams in the serving cell and/or the neighboring cell in the multiple-beam scenario in accordance with the measurement results on the N1 transmission beams in the serving cell and/or the neighboring cell, which will be described hereinafter in more details.

Figure 4:
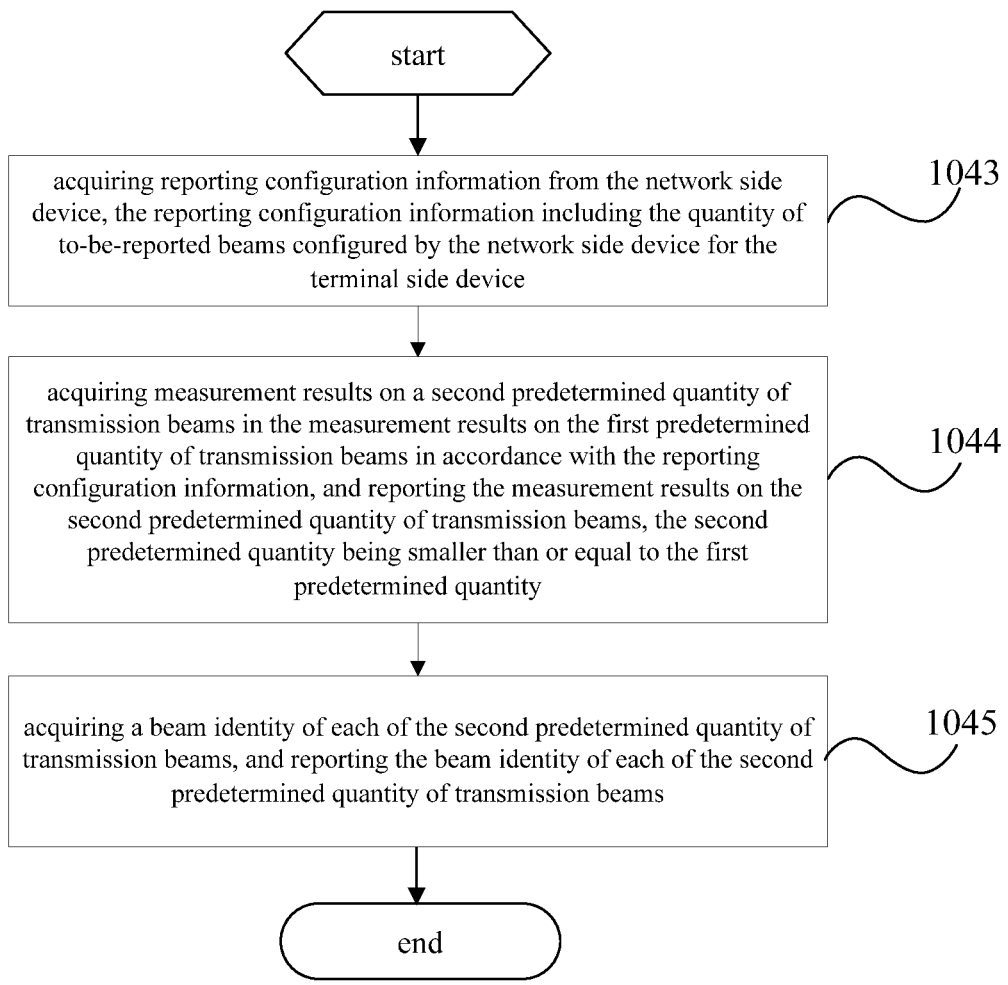
FIG. 4 is yet another flow chart of the sub-steps of the beam measurement reporting method according to some embodiments of the present disclosure.

In a possible embodiment of the present disclosure, as shown in FIG. 4, Step 104 may include the following steps.

Step 1043: acquiring reporting configuration information from the network side device, the reporting configuration information including the quantity of to-be-reported beams configured by the network side device for the terminal side device.

Here, the network side device may configure for the terminal side device the quantity Np2 of to-be-reported beams (for ease of description, the quantity of to-be-reported beams configured by the network side device for the terminal side device may be represented by Np2), so as to facilitate the subsequent determination of the quantity of to-be-reported beams by the terminal side device, thereby to enable the terminal side device to report the beam measurement result in the multiple-beam scenario.

The network side device may configure several to-be-reported beams for a UE through SI or a dedicated RRC message (e.g., a reconfiguration message). In other words, the reporting configuration information may be included in the SI or the dedicated RRC message.

Step 1044: acquiring measurement results on a second predetermined quantity of transmission beams in the measurement results on the first predetermined quantity of transmission beams in accordance with the reporting configuration information, and reporting the measurement results on the second predetermined quantity of transmission beams, the second predetermined quantity being smaller than or equal to the first predetermined quantity.

Here, when reporting the beam measurement results, the terminal side device may acquire the measurement results on the second predetermined quantity N2 of transmission beams (for ease of description, the second predetermined quantity may be represented by N2) in the measurement results on the N1 transmission beams (i.e., the measurement results on the N1 transmission beams in the serving cell and/or neighboring cell) in accordance with the reporting configuration information, and report the measurement results on the N2 transmission beams to the network side device for subsequent use. In this way, it is able to report the beam measurement results in the multiple-beam scenario, thereby to further improve the network performance.

In a possible embodiment of the present disclosure, Step 104 may further include Step 1045 of acquiring a beam identity of each of the second predetermined quantity of transmission beams, and reporting the beam identity of each of the second predetermined quantity of transmission beams.

At this time, when reporting the measurement results on the N2 transmission beams, the terminal side device may report the beam identities of the N2 transmission beams simultaneously for the subsequent use by the network side device.

The beam identity may be beam identity (ID) identification information, e.g., a serial number.

In the embodiments of the present disclosure, the terminal side device may acquire the measurement results on the N2 transmission beams in the measurement results on the N1 transmission beams in two modes, which will be described hereinafter.

Mode 1: in Step 1044, the acquiring the measurement results on the second predetermined quantity of transmission beams in the measurement results on the first predetermined quantity of transmission beams in accordance with the reporting configuration information may include, when the configured quantity of to-be-reported beams is smaller than the first predetermined quantity, determining the configured quantity of to-be-reported beams as the second predetermined quantity, and acquiring the measurement results on the second predetermined quantity of transmission beams in the measurement results on the first predetermined quantity of transmission beams. The measurement results on the second predetermined quantity of transmission beams may each be greater than or equal to the measurement results on the transmission beams other than the second predetermined quantity of transmission beams.

Here, when Np2 is smaller than N1, i.e., when the quantity of to-be-reported beams configured by the network side device is smaller than the quantity of beams measured by the terminal side device, N2=Np2 i.e., the terminal side device may report the measurement results on the Np2 beams configured by the network side device so as to fully meet the network requirement. Then, the terminal side device may acquire and report the best measurement results on the N2 (i.e., Np2) transmission beams in the measurement results on the N1 transmission beams for the subsequent use by the network side device, i.e., the acquired measurement results on the N2 transmission beams may be greater than or equal to the measurement results on the other transmission beams.

When the configured quantity of to-be-reported beams is greater than or equal to the first predetermined quantity, the first predetermined quantity may be determined as the second predetermined quantity, and the measurement results on the first predetermined quantity of transmission beams may be taken as the measurement results on the second predetermined quantity of transmission beams.

Here, when Np2 is greater than or equal to N1, i.e., when the quantity of to-be-reported beams configured by the network side device is greater than or equal to the quantity of beams measured by the terminal side device, N2=N1, i.e., all the measurement results on the N1 transmission beams measured by the terminal side device may be reported to the network side device for subsequent use, so as to fully meet the network requirement.

At this time, several best measurement results on the transmission beams may be reported to the network side device in accordance with a reporting requirement configured by the network side device, so as to provide data to the network side device for network statistics and network optimization.

Mode 2: in Step 1044, the acquiring the measurement results on the second predetermined quantity of transmission beams in the measurement results on the first predetermined number of transmission beams in accordance with the reporting configuration information may include acquiring measurement results on transmission beams of a third type greater than a second predetermined threshold in the measurement results on the first predetermined quantity of transmission beams.

Here, the measurement results on the transmission beams of the third type greater than the second predetermined threshold may be acquired in the measurement results on the first predetermined quantity of transmission beams for the subsequent use.

When the quantity of the transmission beams of the third type is smaller than the configured quantity of to-be-reported beams, the quantity of the transmission beams of the third type may be determined as the second predetermined quantity, and the measurement results on the transmission beams of the third type may be taken as the measurement results on the second predetermined quantity of transmission beams.

Here, when the quantity of the transmission beams of the third type is smaller than Np2, all the acquired measurement results on the transmission beams of the third type may be reported to the network side device for subsequent use, so as to fully meet the network requirement.

When the quantity of the transmission beams of the third type is greater than or equal to the configured quantity of to-be-reported beams, the configured quantity of to-be-reported beams may be determined as the second predetermined quantity, and the measurement results on the second predetermined quantity of transmission beams maybe acquired in the measurement results on the transmission beams of the third type.

Here, when the quantity of the transmission beams of the third type is greater than or equal to Np2, N2=Np2 i.e., the measurement results on the Np2 transmission beams configured by the network side device may be reported, so as to fully meet the network requirement. Then, the measurement results on the N2 (i.e., Np2) transmission beams may be acquired in the acquired measurement results on the transmission beams of the third type, and reported to the network side device for subsequent use.

At this time, the measurement results on several transmission beams greater than a second predetermined threshold may be reported to the network side device in accordance with the reporting requirement configured by the network side device, so as to provide data to the network side device for network statistics and network optimization, thereby to improve the network performance.

The second predetermined threshold may be predefined, or configured through the SI or the dedicated RRC message.

Based on the above, the terminal side device may accurately determine the cell quality of the serving cell and/or the neighboring cell in accordance with the measurement results on the N1 transmission beams in the serving cell and/or the neighboring cell, so as to report the cell quality in the multiple-beam scenario. In addition, the terminal side device may further report the measurement results on the transmission beams in the serving cell and/or the neighboring cell in the multiple-beam scenario in accordance with the measurement results on the N1 transmission beams in the serving cell and/or the neighboring cell.

In the embodiments of the present disclosure, the terminal side device may perform the measurement reporting operation in accordance with the measurement results on the transmission beams in the serving cell and/or the neighboring cell in a periodical reporting mode or an event-triggering reporting mode, which will be described hereinafter in more details.

Periodical Reporting Mode

In a possible embodiment of the present disclosure, Step 104 may include periodically performing the measurement reporting operation in accordance with the measurement results on the first predetermined quantity of transmission beams and a predetermined period.

At this time, the terminal side device may periodically perform the measurement reporting operation in accordance with the measurement results on the N1 transmission beams in the serving cell and/or the neighboring cell as well as the predetermined period, so as to perform the measurement reporting operation in the multiple-beam scenario.

As mentioned hereinabove, a content to be reported may include the cell quality of the serving cell and/or the neighboring cell, or the measurement results on the transmission beams in the serving cell and/or the neighboring cell, or both the cell quality of the serving cell and/or the neighboring cell as well as the measurement results on the transmission beams in the serving cell and/or the neighboring cell.

Event-Triggering Reporting Mode

Figure 5:
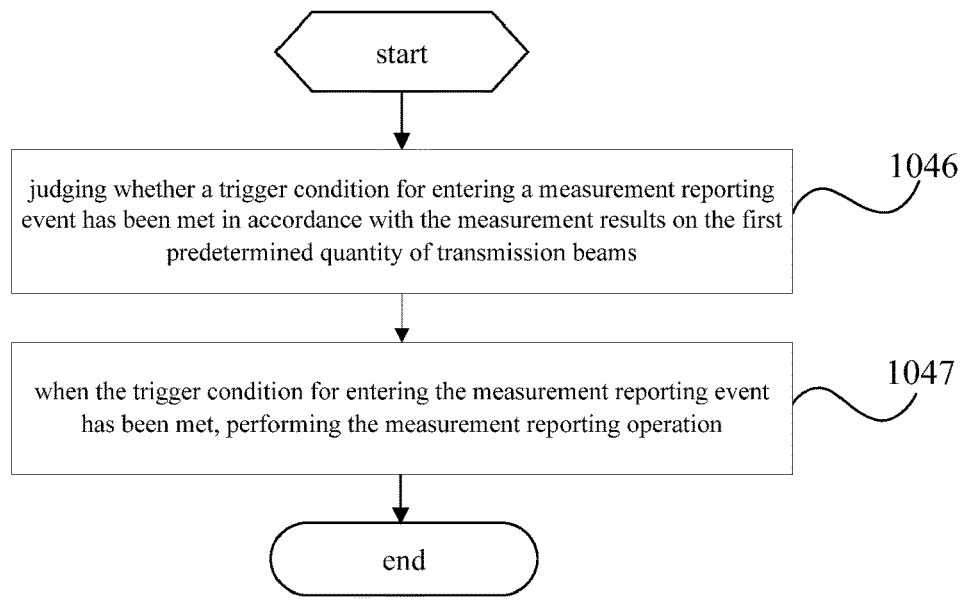
FIG. 5 is still yet another flow chart of the sub-steps of the beam measurement reporting method according to some embodiments of the present disclosure.

In a possible embodiment of the present disclosure, as shown in FIG. 5, Step 104 may include the following steps.

Step 1046: judging whether a trigger condition for entering a measurement reporting event has been met in accordance with the measurement results on the first predetermined quantity of transmission beams.

Here, the trigger condition for entering the measurement reporting event in the multiple-beam scenario has been defined, and the terminal side device may accurately judge whether the measurement reporting operation is to be performed in accordance with the measurement results on the N1 transmission beams and the trigger condition, so as to enter the measurement reporting event in the multiple-beam scenario.

Step 1047: when the trigger condition for entering the measurement reporting event has been met, performing the measurement reporting operation.

Here, when the trigger condition for entering the measurement reporting event has been met, the measurement reporting operation may be performed, so as to report the measurement results in the multiple-beam scenario.

As mentioned hereinabove, a content to be reported may include the cell quality of the serving cell and/or the neighboring cell, or the measurement results on the transmission beams in the serving cell and/or the neighboring cell, or both the cell quality of the serving cell and/or the neighboring cell and the measurement results on the transmission beams in the serving cell and/or the neighboring cell.

In a possible embodiment of the present disclosure, the measurement reporting method may further include judging whether a trigger condition for exiting the measurement reporting event has been met in accordance with the measurement results on the first predetermined quantity of transmission beams.

Here, the trigger condition for exiting the measurement reporting event in the multiple-beam scenario has been defined, and the terminal side device may accurately judge whether the measurement reporting operation is to be ceased in accordance with the measurement results on the N1 transmission beams and the trigger condition, so as to exit the measurement reporting event in the multiple-beam scenario.

When the trigger condition for exiting the reporting even has been met, the measurement reporting operation may be ceased.

Here, when the trigger condition for exiting the reporting even has been met, the measurement reporting operation may be ceased in time.

In the embodiments of the present disclosure, the trigger conditions for various measurement reporting events have been redefined in the multiple-beam scenario so as to meet the requirements in different scenarios, which will be described hereinafter in more details.

In a possible embodiment of the present disclosure, Step 103 may include Step 1031 of acquiring a measurement result of a first predetermined reference signal on the first predetermined quantity of transmission beams in the serving cell where the terminal side device is located.

The trigger condition for entering the measurement reporting event may include a condition 1: $Mx+Ox-Hys>Thresh1$, and the trigger condition for exiting the measurement reporting event may include a condition 2: $Mx+Ox+Hys<Thresh1$, where $Mx$ represents the measurement result of the first predetermined reference signal x on the transmission beams in the serving cell, $Ox$ represents a frequency-specific offset for x on the transmission beams in the serving cell, $Hys$ represents a delay parameter of the measurement reporting event, and $Thresh1$ represents a first threshold parameter of the measurement reporting event.

At this time, based on the condition 1 and the condition 2, a resource for the first predetermined reference signal in the serving cell may become better than a threshold.

$Mx$ represents the measurement result of the first predetermined reference signal x, without taking any offset into consideration. $Ox$ represents the frequency-specific offset for x (i.e., an individual offset defined in a $3^{rd}$-Generation Partnership Project (3GPP) New Radio (NR) technique for a measurement object corresponding to a frequency of x). When the frequency-specific offset is not configured for x, the frequency-specific offset may be set as zero. $Hys$ represents the delay parameter of the measurement reporting event (i.e., the delay defined in the NR technique and configured for the measurement reporting event). $Thresh1$ represents the first threshold parameter of the measurement reporting event (i.e., a threshold defined in the NR technique and configured for the measurement reporting event).

Mx and Thresh1 may be represented by dBm, and Ox and Hys may be represented by dB.

As mentioned hereinabove, the first predetermined reference signal x may include the xSS or the CSI-RS, or at least two of the xSS, the CSI-RS and the DMRS. The xSS may include the SSS, or both the PSS and the SSS.

To be specific, the terminal side device may measure the RSRP of the xSS on the N1 transmission beams in the serving cell, and at this time, the measurement reporting event may be marked as Event S1.

For the Event S1, Mx may be represented by Mss and Ox may be represented by Oss. When the condition Mss+Oss−Hys>Thresh1 has been met, the terminal side device may trigger the measurement reporting event, and report the measurement results to the network side device. When the condition Mss+Oss+Hys<Thresh1 has been met, the terminal side device may not trigger the measurement reporting event, and cease reporting the measurement results to the network side device.

At this time, under the Event S1, a resource for the xSS in the serving cell may become better than the threshold.

Mss represents the measurement result of the xSS, without taking any offset into consideration. Oss represents the frequency-specific offset for the xSS (i.e., an individual offset defined in the NR technique for a measurement object corresponding to a frequency of the xSS). When the frequency-specific offset is not configured for the xSS, the frequency-specific offset may be set as zero. Hys represents the delay parameter of the measurement reporting event (i.e., the delay defined in the NR technique and configured for the measurement reporting event). Thresh1 represents the first threshold parameter of the measurement reporting event (i.e., a threshold s1-Threshold defined in the NR technique and configured for the measurement reporting event). Mss and Thresh1 may be represented by dBm, and Oss and Hys may be represented by dB.

To be specific, the terminal side device may also measure the RSRP of the xSS and the CSI-RS on the N1 transmission beams in the serving cell. At this time, the measurement reporting event may be marked as Event CS1.

For the Event CS1, with respect to the xSS, Mx may be represented by Mss, and Ox may be represented by Oss. With respect to the CSI-RS, Mx may be represented by Mcr, and Ox may be represented by Ocr. When the conditions Mss+Oss−Hys>Thresh1 and Mcr+Ocr−Hys>Thresh1 have been met, the terminal side device may trigger the measurement reporting event, and report the measurement results to the network side device. When the conditions Mss+Oss+Hys<Thresh1 and Mcr+Ocr+Hys<Thresh1 have been met, the terminal side device may not trigger the measurement reporting event, and cease reporting the measurement results to the network side device.

At this time, under the Event CS1, resources for the xSS and the CSI-RS in the serving cell may become better than the threshold.

The description about Mss, Thresh1, Oss and Hys may refer to that mentioned hereinabove, and the description about Mcr and Ocr may refer to that about Mss and Oss.

To be specific, the terminal side device may also measure the RSRP of the xSS, the CSI-RS and the DMRS on the N1 transmission beams in the serving cell. At this time, the measurement reporting event may be marked as Event DCS1.

For the Event DCS1, with respect to the xSS, Mx may be represented by Mss, and Ox may be represented by Oss. With respect to the CSI-RS, Mx may be represented by Mcr, and Ox may be represented by Ocr. With respect to the DMRS, Mx may be represented by Mdm, and Ox may be represented by Odm. When the conditions Mss+Oss−Hys>Thresh1, Mcr+Ocr−Hys>Thresh1 and Mdm+Odm−Hys>Thresh1 have been met, the terminal side device may trigger the measurement reporting event, and report the measurement results to the network side device. When the conditions Mss+Oss+Hys<Thresh1, Mcr+Ocr+Hys<Thresh1 and Mdm+Odm+Hys<Thresh1 have been met, the terminal side device may not trigger the measurement reporting event, and cease reporting the measurement results to the network side device.

At this time, under the Event DCS1, resources for the xSS, the CSI-RS and the DMRS in the serving cell may become better than the threshold.

The description about Mss, Thresh1, Oss and Hys may refer to that mentioned hereinabove, and the description about Mcr, Ocr, Mdm and Odm may refer to that about Mss and Oss.

In another possible embodiment of the present disclosure, Step 103 may include Step 1031 of acquiring the measurement result of the first predetermined reference signal on the first predetermined quantity of transmission beams in the serving cell where the terminal side device is located.

The trigger condition for entering the measurement reporting event may include a condition 3: Mx+Ox−Hys>Mref+Oref+Off, and the trigger condition for exiting the measurement reporting event may include a condition 4: Mx+Ox+Hys<Mref+Oref+Off, where Mx represents the measurement result of the first predetermined reference signal x on the transmission beams in the serving cell, Ox represents a frequency-specific offset for x on the transmission beams in the serving cell, Hys represents a delay parameter of the measurement reporting event, represents a measurement result of a reference x on the transmission beams in the serving cell, Oref represents a frequency-specific offset of the reference x on the transmission beams in the serving cell, and Off represents an offset parameter of the measurement reporting event.

At this time, based on the condition 3 and the condition 4, a resource for the first predetermined reference signal x in the serving cell may be offset in a better manner than a reference additional RS or x resource.

The description about Mx, Thresh1 Ox and Hys may refer to that mentioned hereinabove. Mref represents the measurement result of the reference x resource (i.e., a reference c2-Ref defined in the NR technique and configured with respect to the measurement reporting event) without taking any offset into consideration. Oref represents the frequency-specific offset for the reference x resource (i.e., an individual offset defined in the NR technique for a measurement object corresponding to a frequency of the reference x resource). When the frequency-specific offset is not configured for reference x resource, the frequency-specific offset may be set as zero. Off represents the offset parameter of the measurement reporting event (i.e., an offset s2-Offset defined in the NR technique for the measurement reporting event).

Mx, Mref and Thresh1 may be represented by dBm, and Ox, Oref Hys and Off may be represented by dB.

As mentioned hereinabove, the first predetermined reference signal x may include the xSS or the CSI-RS, or at least two of the xSS, the CSI-RS and the DMRS. The xSS may include the SSS, or both the PSS and the SSS.

To be specific, the terminal side device may measure the RSRP of the xSS on the N1 transmission beams in the serving cell, and at this time, the measurement reporting event may be marked as Event S2.

For the Event S2, Mx may be represented by Mss, and Ox may be represented by Oss. When the condition Mss+Oss−Hys>Mref+Oref+Off has been met, the terminal side device may trigger the measurement reporting event, and report the measurement results to the network side device. When the condition Mss+Oss+Hys<Mref+Oref+Off has been met, the terminal side device may not trigger the measurement reporting event, and cease reporting the measurement results to the network side device.

At this time, under the Event S2, a resource for the xSS in the serving cell may be offset in a better manner than a reference additional RS or xSS resource.

The description about Mss, Oss, Hys, Mref, Oref and Off may refer to that mentioned hereinabove.

To be specific, the terminal side device may also measure the RSRP of the xSS and the CSI-RS on the N1 transmission beams in the serving cell. At this time, the measurement reporting event may be marked as Event CS2.

For the Event CS2, with respect to the xSS, Mx may be represented by Mss, and Ox may be represented by Oss. With respect to the CSI-RS, Mx may be represented by Mcr, and Ox may be represented by Ocr. When the conditions Mss+Oss−Hys>Mref+Oref+Off and Mcr+Ocr−Hys>Mref+Oref+Off have been met, the terminal side device may trigger the measurement reporting event, and report the measurement results to the network side device. When the conditions Mss+Oss+Hys<Mref+Oref+Off and Mcr+Ocr+Hys<Mref+Oref+Off have been met, the terminal side device may not trigger the measurement reporting event, and cease reporting the measurement results to the network side device.

At this time, under the Event CS2, resources for the xSS and the CSI-RS in the serving cell may be offset in a better manner than the reference additional RS or xSS resource.

The description about Mss, Oss, Hys, Mref, Oref and Off may refer to that mentioned hereinabove, and the description about Mcr and Ocr may refer to that about Mss and Oss.

In yet another possible embodiment of the present disclosure, Step 103 may include Step 1031 of acquiring the measurement result of the first predetermined reference signal on the first predetermined quantity of transmission beams in the serving cell where the terminal side device is located.

The trigger condition for entering the measurement reporting event may include a condition 5: Mx+Ox+Hys<Thresh1, and the trigger condition for exiting the measurement reporting event may include a condition 6: Mx+Ox−Hys>Thresh1, where Mx represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents the first threshold parameter of the measurement reporting event.

At this time, based on the condition 5 and the condition 6, a resource for the first predetermined reference signal in the serving cell may become worse than the threshold.

The description about Mx, Thresh1, Ox and Hys may refer to that mentioned hereinabove.

As mentioned hereinabove, the first predetermined reference signal x may include the xSS or the CSI-RS, or at least two of the xSS, the CSI-RS and the DMRS. The xSS may include the SSS, or both the PSS and the SSS.

To be specific, the terminal side device may measure the RSRP of the xSS on the N1 transmission beams in the serving cell, and at this time, the measurement reporting event may be marked as Event S3a.

For the Event S3a, Mx may be represented by Mss, and Ox may be represented by Oss. When the condition Mss+Oss+Hys<Thresh1 has been met, the terminal side device may trigger the measurement reporting event, and report the measurement results to the network side device. When the condition Mss+Oss−Hys>Thresh1 has been met, the terminal side device may not trigger the measurement reporting event, and cease reporting the measurement results to the network side device.

At this time, under the Event S3a, a resource for the xSS in the serving cell may become worse than the threshold.

The description about Mss, Oss, Thresh1 and Hys may refer to that mentioned hereinabove.

To be specific, the terminal side device may also measure the RSRP of the CSI-RS on the N1 transmission beams in the serving cell. At this time, the measurement reporting event may be marked as Event S3b.

For the Event S3b, Mc may be represented by Mcr, and Ox may be represented by Ocr. When the condition Mcr+Ocr+Hys<Thresh1 has been met, the terminal side device may trigger the measurement reporting event, and report the measurement results to the network side device. When the condition Mcr+Ocr−Hys>Thresh1 has been met, the terminal side device may not trigger the measurement reporting event, and cease reporting the measurement results to the network side device.

At this time, under the Event S3b, a resource for the CSI-RS in the serving cell may become worse than the threshold.

The description about Thresh1 and Hys may refer to that mentioned hereinabove, and the description about Mcr and Ocr may refer to that about Mss and Oss.

To be specific, the terminal side device may also measure the RSRP of the xSS and the CSI-RS on the N1 transmission beams in the serving cell. At this time, the measurement reporting event may be marked as Event CS3.

For the Event CS3, with respect to the xSS, Mx may be represented by Mss, and Ox may be represented by Oss. With respect to the CSI-RS, Mx may be represented by Mcr, and Ox may be represented by Ocr. When the conditions Mss+Oss+Hys<Thresh1 and Mcr+Ocr+Hys<Thresh1 have been met, the terminal side device may trigger the measurement reporting event, and report the measurement results to the network side device. When the conditions Mss+Oss−Hys>Thresh1 and Mcr+Ocr−Hys>Thresh1 have been met, the terminal side device may not trigger the measurement reporting event, and cease reporting the measurement results to the network side device.

At this time, under the Event CS3, resources for the xSS and the CSI-RS in the serving cell may become worse than the threshold.

The description about Mss, Thresh1, Oss, and Hys may refer to that mentioned hereinabove, and the description about Mcr and Ocr may refer to that about Mss and Oss.

In still yet another possible embodiment of the present disclosure, Step 103 may include: Step 1031 of acquiring the measurement result of the first predetermined reference signal on the first predetermined quantity of transmission beams in the serving cell where the terminal side device is located; and Step 1032 of acquiring a measurement result of a second predetermined reference signal on the first predetermined quantity of transmission beams in the neighboring cell of the serving cell.

The trigger condition for entering the measurement reporting event may include a condition 7: Mn+Ofn+Ocn−Hys>Mp+Ofp+Ocp+Off, and the trigger condition for exiting the measurement reporting event may include a condition 8: Mn+Ofn+Ocn+Hys<Mp+Ofp+Ocp+Off, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, represents the measurement result of the first predetermined reference signal x on the transmission beams in the serving cell, Ofp represents a frequency-specific offset of x on the transmission beams in the serving cell, Ocp represents a cell-specific offset of x on the transmission beams in the serving cell, and Off represents an offset parameter of the measurement reporting event.

At this time, based on the condition 7 and the condition 8, a resource for the second predetermined reference signal y in the neighboring cell may become better than the resource for the first predetermined reference signal x in the serving cell.

Mn represents the measurement result in the neighboring cell without taking any offset into consideration. Ofn represents the frequency-specific offset in the neighboring cell. Ocn represents the cell-specific offset in the neighboring cell, and when no cell-specific offset is configured for the neighboring cell, it may be set as zero. Mp represents the measurement result in the serving cell without taking any offset into consideration. Ofp represents the frequency-specific offset for the frequency in the serving cell. Ocp represents the cell-specific offset in the serving cell, and when no cell-specific offset is not configured for the serving cell, it may be set as zero. Hys represents the delay parameter of the measurement reporting event. Off represents the offset parameter of the measurement reporting event.

Mn and Mp may be represented by dBm in the case of RSRP, or represented by dB in the case of RSRQ or RS-SINR, and Ofn, Ocn, Ofp, Ocp. Hys and Off may be represented by dB.

To be specific, the terminal side device may measure at least one of the RSRP, the RSRQ and the RS-SINR of the xSS on the N1 transmission beams in the serving cell and the neighboring cell, and at this time, the measurement reporting event may be marked as Event S4a.

For the Event S4a, when the condition Mn+Ofn+Ocn−Hys>Mp+Ofp+Ocp+Off has been met, the terminal side device may trigger the measurement reporting event, and report the measurement results to the network side device. When the condition Mn+Ofn+Ocn+Hys<Mp+Ofp+Ocp+Off has been met, the terminal side device may not trigger the measurement reporting event, and cease reporting the measurement results to the network side device.

At this time, under the Event S4a, a resource for the xSS in the neighboring cell may become better than the resource for the xSS in the serving cell.

The description about Mn, Mp, Ofn, Ocn, Ofp, Ocp, Hys and Off may refer to that mentioned hereinabove.

To be specific, the terminal side device may also measure at least one of the RSRP, the RSRQ and the RS-SINR of the CSI-RS on the N1 transmission beams in the serving cell and the neighboring cell, and at this time, the measurement reporting event may be marked as Event S4b.

For the Event S4b, when the condition Mn+Ofn+Ocn−Hys>Mp+Ofp+Ocp+Off has been met, the terminal side device may trigger the measurement reporting event, and report the measurement results to the network side device. When the condition Mn+Ofn+Ocn+Hys<Mp+Ofp+Ocp+Off has been met, the terminal side device may not trigger the measurement reporting event, and cease reporting the measurement results to the network side device.

At this time, under the Event S4b, a resource for the CSI-RS in the neighboring cell may become better than the resource for the CSI-RS in the serving cell.

The description about Mn, Mp, Ofn, Ocn, Ofp, Ocp, Hys and Off may refer to that mentioned hereinabove.

To be specific, the terminal side device may measure at least one of the RSRP, the RSRQ and the RS-SINR of the xSS and the CSI-RS on the N1 transmission beams in the serving cell and the neighboring cell, and at this time, the measurement reporting event may be marked as Event CS4.

For the Event CS4, when the condition Mn+Ofn+Ocn−Hys>Mp+Ofp+Ocp+Off has been met, the terminal side device may trigger the measurement reporting event, and report the measurement results to the network side device. When the condition Mn+Ofn+Ocn+Hys<Mp+Ofp+Ocp+Off has been met, the terminal side device may not trigger the measurement reporting event, and cease reporting the measurement results to the network side device.

At this time, under the Event CS4, resources for the xSS and the CSI-RS in the neighboring cell may become better than the resources for the xSS and the CSI-RS in the serving cell.

The description about Mn, Mp, Ofn, Ocn, Ofp, Ocp, Hys and Off may refer to that mentioned hereinabove.

In still yet another possible embodiment of the present disclosure, Step 103 may include Step 1032 of acquiring the measurement result of the second predetermined reference signal on the first predetermined quantity of transmission beams in the neighboring cell of the serving cell where the terminal side device is located.

The trigger condition for entering the measurement reporting event may include a condition 9: Mn+Ofn+Ocn−Hys>Thresh2, and the trigger condition for exiting the measurement reporting event may include a condition 10: Mn+Ofn+Ocn+Hys<Thresh2, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, and Thresh2 represents a second threshold parameter of the measurement reporting event.

At this time, based on the condition 9 and the condition 10, a resource for the second predetermined reference signal in the neighboring cell may become better than the threshold.

The description about Mn, Ofn, Ocn and Hys may refer to that mentioned hereinabove, and the description about Thresh2 may refer to that about Thresh1.

To be specific, the terminal side device may measure at least one of the RSRP, the RSRQ and the RS-SINR of the xSS on the N1 transmission beams in the neighboring cell, and at this time, the measurement reporting event may be marked as Event S5a.

For the Event S5a, when the condition Mn+Ofn+Ocn−Hys>Thresh2 has been met, the terminal side device may trigger the measurement reporting event, and report the measurement results to the network side device. When the condition Mn+Ofn+Ocn+Hys<Thresh2 has been met, the terminal side device may not trigger the measurement reporting event, and cease reporting the measurement results to the network side device.

At this time, under the Event S5a, the resource for the xSS in the neighboring cell may become better than the threshold.

The description about Mn, Ofn, Ocn and Hys may refer to that mentioned hereinabove, and the description about Thresh2 may refer to that about Thresh1.

To be specific, the terminal side device may also measure at least one of the RSRP, the RSRQ and the RS-SINR of the CSI-RS on the N1 transmission beams in the neighboring cell, and at this time, the measurement reporting event may be marked as Event S5b.

For the Event S5b, when the condition Mn+Ofn+Ocn−Hys>Thresh2 has been met, the terminal side device may trigger the measurement reporting event, and report the measurement results to the network side device. When the condition Ofn+Ocn+Hys<Thresh2 has been met, the terminal side device may not trigger the measurement reporting event, and cease reporting the measurement results to the network side device.

At this time, under the Event S5b, the resource for the CSI-RS in the neighboring cell may become better than the threshold.

The description about Mn, Ofn, Ocn and Hys may refer to that mentioned hereinabove, and the description about Thresh2 may refer to that about Thresh1.

To be specific, the terminal side device may also measure at least one of the RSRP, the RSRQ and the RS-SINR of the xSS and the CSI-RS on the N1 transmission beams in the neighboring cell, and at this time, the measurement reporting event may be marked as Event CS5.

For the Event CS5, when the condition Mn+Ofn+Ocn−Hys>Thresh2 has been met, the terminal side device may trigger the measurement reporting event, and report the measurement results to the network side device. When the condition Ofn+Ocn+Hys<Thresh2 has been met, the terminal side device may not trigger the measurement reporting event, and cease reporting the measurement results to the network side device.

At this time, under the Event CS5, the resources for the xSS and the CSI-RS in the neighboring cell may become better than the threshold.

The description about Mn, Mp, Ofn, Ocn, Ofp, Ocp, Hys and Off may refer to that mentioned hereinabove.

In still yet another possible embodiment of the present disclosure, Step 103 may include: Step 1031 of acquiring the measurement result of the first predetermined reference signal on the first predetermined quantity of transmission beams in the serving cell where the terminal side device is located; and Step 1032 of acquiring the measurement result of the second predetermined reference signal on the first predetermined quantity of transmission beams in the neighboring cell of the serving cell.

The trigger condition for entering the measurement reporting event may include a condition 11: Mx+Ox+Hys<Thresh1 and Mn+Ofn+Ocn−Hys>Thresh2 and the trigger condition for exiting the measurement reporting event may include a condition 12: Mx+Ox−Hys>Thresh1 and Mn+Ofn+Ocn+Hys<Thresh2 where Mx represents the measurement result of the first predetermined reference signal x on the transmission beams in the serving cell, Ox represents the frequency-specific offset for x on the transmission beams in the serving cell, Hys represents a delay parameter of the measurement reporting event, Thresh1 represents the first threshold parameter of the measurement reporting event, Mn represents the measurement result of the second predetermined reference signal y on the transmission beams in the neighboring cell of the serving cell, Ofn represents the frequency-specific offset for y on the transmission beams in the neighboring cell, Ocn represents the cell-specific offset for y on the transmission beams in the neighboring cell, and Thresh2 represents the second threshold parameter of the measurement reporting event.

At this time, based on the condition 11 and the condition 12, the resource for the first predetermined reference signal in the serving cell may become worse than the first threshold, and the resource for the second predetermined reference signal in the neighboring cell may become better than the second threshold.

The description about Mx, Ox, Mn, Ofn, Ocn, Hys and Thresh1 may refer to that mentioned hereinabove, and the description about Thresh2 may refer to that about Thresh1.

To be specific, the terminal side device may measure at least one of the RSRP, the RSRQ and the RS-SINR of the xSS on the N1 transmission beams in the serving cell and the neighboring cell, and at this time, the measurement reporting event may be marked as Event S6a.

For the Event S6a, Mx may be represented by Mss, and Ox may be represented by Oss. When the conditions Mss+Oss+Hys<Thresh1 and Mn+Ofn+Ocn−Hys>Thresh2 have been met, the terminal side device may trigger the measurement reporting event, and report the measurement results to the network side device. When the conditions Mss+Oss−Hys>Thresh1 and Mn+Ofn+Ocn+Hys<Thresh2 have been met, the terminal side device may not trigger the measurement reporting event, and cease reporting the measurement results to the network side device.

At this time, under the Event S6a, the resource for the xSS in the serving cell may become worse than the first threshold, and the resource for the xSS in the neighboring cell may become better than the second threshold.

The description about Mx, Ox, Mn, Ofn, Ocn, Hys and Thresh1 may refer to that mentioned hereinabove, and the description about Thresh2 may refer to that about Thresh1.

To be specific, the terminal side device may also measure at least one of the RSRP, the RSRQ and the RS-SINR of the CSI-RS on the N1 transmission beams in the serving cell and the neighboring cell, and at this time, the measurement reporting event may be marked as Event S6b.

For the Event S6b, Mc may be represented by Mcr, and Ox may be represented by Ocr. When the conditions Mcr+Ocr+Hys<Thresh1 and Mn+Ofn+Ocn−Hys>Thresh2 have been met, the terminal side device may trigger the measurement reporting event, and report the measurement results to the network side device. When the conditions Mcr+Ocr−Hys>Thresh1 and Mn+Ofn+Ocn+Hys<Thresh2 have been met, the terminal side device may not trigger the measurement reporting event, and cease reporting the measurement results to the network side device.

At this time, under the Event S6b, the resource for the CSI-RS in the serving cell may become worse than the first threshold, and the resource for the CSI-RS in the neighboring cell may become better than the second threshold.

The description about Mn, Ofn, Ocn, Hys and Thresh1 may refer to that mentioned hereinabove, the description about Mcr and Ocr may refer to that about Mss and Oss, and the description about Thresh2 may refer to that about Thresh1.

To be specific, the terminal side device may also measure at least one of the RSRP, the RSRQ and the RS-SINR of the xSS and the CSI-RS on the N1 transmission beams in the serving cell and the neighboring cell, and at this time, the measurement reporting event may be marked as Event CS6.

For the Event CS6, with respect to the xSS, Mx may be represented by Mss, and Ox may be represented by Oss. With respect to the CSI-RS, Mx may be represented by Mcr, and Ox may be represented by Ocr. When the conditions Mss+Oss+Hys<Thresh1, Mcr+Ocr+Hys<Thresh1 and Mn+Ofn+Ocn−Hys>Thresh2 have been met, the terminal side device may trigger the measurement reporting event, and report the measurement results to the network side device. When the conditions Mss+Oss−Hys>Thresh1, Mcr+Ocr−Hys>Thresh1 and Mn+Ofn+Ocn+Hys<Thresh2 and have been met, the terminal side device may not trigger the measurement reporting event, and cease reporting the measurement results to the network side device.

At this time, under the Event CS6, the resources for the xSS and the CSI-RS in the serving cell may become worse that the first threshold, but the resources for the xSS and the CSI-RS in the neighboring cell may become better than the second threshold.

The description about Mss, Oss, Mn, Ofn, Ocn, Hys and Thresh1 may refer to that mentioned hereinabove, the description about Mcr and Ocr may refer to that about Mss and Oss, and the description about Thresh2 may refer to that about Thresh1.

According to the beam measurement reporting method in the embodiments of the present disclosure, it is able to measure and report the beams for a measurement object, e.g., the xSS or the CSI-RS, or measurement objects, e.g., at least two of the xSS, the CSI-RS and the DMRS, in the multiple-beam scenario, and trigger the measurement reporting event, thereby to improve the network performance.

In a possible embodiment of the present disclosure, Step 103 may include acquiring the measurement results of the predetermined reference signal on the first predetermined quantity of transmissions beams received on each reception beam included in a reception antenna group of the terminal side device.

Here, the measurement results on the N1 transmission beams (the measurement results on the N1 transmission beams in the serving cell and/or the neighboring cell) may be acquired on ach transmission beam included in the reception antenna group of the terminal side device, and then the measurement result acquired on each reception transmission beam may be reported in Step 104.

At this time, through taking the reception antenna group into consideration, it is able to perform the beam measurement in a more accurate and comprehensive manner, thereby to further improve the network performance.

The reception antenna group may be a reception (Rx) beam set or an Rx beam group. Beams in the Rx beam set may be derived from different panels, and beams from the Rx beam group may be derived from a same panel.

Of course, in the embodiments of the present disclosure, the reception antenna group may not be taken into consideration, and instead, the measurement result of the predetermined reference signal on the N1 transmission beams may be acquired once with respect to all the reception antennae. In this way, it is able to perform the beam measurement reporting operation more rapidly.

In a word, according to the beam measurement reporting method in the embodiments of the present disclosure, it is able to perform the multiple-beam measurement reporting operation in the multiple-beam scenario when the measurement object is the xSS or the CSI-RS, or at least two of the xSS, the CSI-RS and the DMRS, thereby to improve the network performance.

Figure 6:
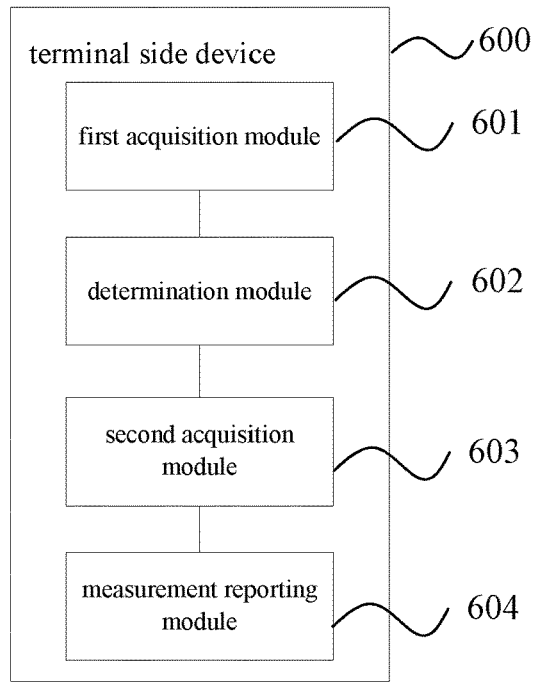
FIG. 6 is a schematic view showing the terminal side device according to some embodiments of the present disclosure.

The present disclosure further provides in some embodiments a terminal side device 600 which, as shown in FIG. 6, includes: a first acquisition module 601 configured to acquire measurement configuration information from a network side device; a determination module 602 configured to determine a first predetermined quantity of transmission beams in a plurality of transmission beams in accordance with the measurement configuration information, the first predetermined quantity of transmission beams being transmission beams to be adopted by the terminal side device in a connected state to perform predetermined reference signal measurement; a second acquisition module 603 configured to acquire a measurement result of a predetermined reference signal on the first predetermined quantity of transmission beams; and a measurement reporting module 604 configured to perform a measurement reporting operation in accordance with the measurement result of the predetermined reference signal on the first predetermined quantity of transmission beams.

According to the terminal side device 600 in the embodiments of the present disclosure, it is able to perform the measurement reporting operation in the multiple-beam scenario, i.e., to solve the problem in the conventional LTE system where the multiple-beam measurement reporting operation is unavailable, thereby to improve the network performance.

In a possible embodiment of the present disclosure, the measurement configuration information may include the quantity of to-be-measured beams configured by the network side device for the terminal side device.

The determination module 602 may include: a first determination sub-module configured to, when the configured quantity of the to-be-measured beams is smaller than a beam measurement quantity capability threshold of the terminal side device, determine the configured quantity of the to-be-measured beams as the first predetermined quantity; and a second determination sub-module configured to, when the configured quantity of the to-be-measured beams is greater than or equal to the beam measurement quantity capability threshold of the terminal side device, determine the beam measurement quantity capability threshold of the terminal side device as the first predetermined quantity.

In a possible embodiment of the present disclosure, the second acquisition module 603 may include: a first acquisition sub-module configured to acquire a measurement result of a first predetermined reference signal on the first predetermined quantity of transmission beams in a serving cell where the terminal side device is located; and/or a second acquisition sub-module configured to acquire a measurement result of a second predetermined reference signal on the first predetermined quantity of transmission beams in a neighboring cell of the serving cell.

In a possible embodiment of the present disclosure, the first predetermined reference signal may include an xSS or a CSI-RS, or at least two of the xSS, the CSI-RS and a DMRS. The second predetermined reference signal may include an xSS or a CSI-RS, or at least two of the xSS, the CSI-RS and a DMRS. The xSS may include an SSS, or both a PSS and the SSS.

In a possible embodiment of the present disclosure, the measurement result may include at least one of RSRP, RSRQ and an RS-SINR.

In a possible embodiment of the present disclosure, when the second acquisition module 603 includes the first acquisition sub-module, the measurement reporting module 604 may include a first reporting sub-module configured to determine cell quality of the serving cell in accordance with the measurement results on the first predetermined quantity of transmission beams, and report the cell quality of the serving cell.

In a possible embodiment of the present disclosure, when the second acquisition module 603 includes the second acquisition sub-module, the measurement reporting module 604 may include a second reporting sub-module configured to determine cell quality of the neighboring cell in accordance with the measurement results on the first predetermined quantity of transmission beams, and report the cell quality of the neighboring cell.

In a possible embodiment of the present disclosure, the first reporting sub-module may include: a first determination unit configured to acquire a measurement result of a current-serving transmission beams in the measurement results on the first predetermined quantity of transmission beams, and determine the cell quality of the serving cell in accordance with the measurement result of the currently-serving transmission beam; or a second determination unit configured to calculate the measurement results on the first predetermined quantity of transmission beams in accordance with a predetermined algorithm, and determine the cell quality of the serving cell in accordance with a calculation result; or a third determination unit configured to acquire measurement results on transmission beams of a first type greater than a first predetermined threshold in the measurement results on the first predetermined quantity of transmission beams, calculate the measurement results on the transmission beams of the first type in accordance with the predetermined algorithm, and determine the cell quality of the serving cell in accordance with a calculation result. The predetermined algorithm may include a summation, averaging or weighting algorithm.

In a possible embodiment of the present disclosure, the second reporting sub-module may include: a fourth determination unit configured to calculate the measurement results on the first predetermined quantity of transmission beams in accordance with a predetermined algorithm, and determine the cell quality of the neighboring cell in accordance with a calculation result; or a fifth determination unit configured to acquire measurement results on transmission beams of a second type greater than the first predetermined threshold in the measurement results on the first predetermined quantity of transmission beams, calculate the measurement results on the transmission beams of the second type in accordance with a predetermined algorithm, and determine the cell quality of the neighboring cell in accordance with a calculation result. The predetermined algorithm may include a summation, averaging or weighting algorithm.

In a possible embodiment of the present disclosure, the measurement reporting module 604 may include: a third acquisition sub-module configured to acquire reporting configuration information from the network side device, the reporting configuration information including the quantity of to-be-reported beams configured by the network side device for the terminal side device; and a third reporting sub-module configured to acquire measurement results on a second predetermined quantity of transmission beams in the measurement results on the first predetermined quantity of transmission beams in accordance with the reporting configuration information, and report the measurement results on the second predetermined quantity of transmission beams. The second predetermined quantity may be smaller than or equal to the first predetermined quantity.

In a possible embodiment of the present disclosure, the measurement reporting module 604 may further include a fourth reporting sub-module configured to acquire a beam identity corresponding to each of the second predetermined quantity of transmission beams, and report the beam identity corresponding to each of the second predetermined quantity of transmission beams.

In a possible embodiment of the present disclosure, the third reporting sub-module may include: a first acquisition unit configured to, when the configured quantity of to-be-reported beams is smaller than the first predetermined quantity, determine the configured quantity of to-be-reported beams as the second predetermined quantity, and acquire the measurement results on the second predetermined quantity of transmission beams in the measurement results on the first predetermined quantity of transmission beams, each of the measurement results on the second predetermined quantity of transmission beams being greater than or equal to the measurement results on the transmission beams other than the second predetermined quantity of transmission beams; and a second acquisition unit configured to, when the configured quantity of to-be-reported beams is greater than or equal to the first predetermined quantity, determine the first predetermined quantity as the second predetermined quantity, and take the measurement results on the first predetermined quantity of transmission beams as the measurement results on the second predetermined quantity of transmission beams.

In a possible embodiment of the present disclosure, the third reporting sub-module may include: a third acquisition unit configured to acquire measurement results on transmission beams of a third type greater than a second predetermined threshold in the measurement results on the first predetermined quantity of transmission beams; a sixth determination unit configured to, when the quantity of the transmission beams of the third type is smaller than the configured quantity of to-be-reported beams, determine the quantity of the transmission beams of the third type as the second predetermined quantity, and take the measurement results on the transmission beams of the third type as the measurement results on the second predetermined quantity of transmission beams; and a fourth acquisition unit configured to, when the quantity of the transmission beams of the third type is greater than or equal to the configured quantity of to-be-reported beams, determine the configured quantity of to-be-reported beams as the second predetermined quantity, and acquire the measurement results on the second predetermined quantity of transmission beams in the measurement results on the transmission beams of the third type.

In a possible embodiment of the present disclosure, the measurement reporting module 604 may include a fifth reporting sub-module configured to periodically perform the measurement reporting operation in accordance with the measurement results on the first predetermined quantity of transmission beams and a predetermined period.

In a possible embodiment of the present disclosure, the measurement reporting module 604 may include: a judgment sub-module configured to judge whether a trigger condition for entering a measurement reporting event has been met in accordance with the measurement results on the first predetermined quantity of transmission beams; and an entry reporting sub-module configured to, when the trigger condition for entering the measurement reporting event has been met, perform the measurement reporting operation.

In a possible embodiment of the present disclosure, the terminal side device may further include: a judgment module configured to judge whether a trigger condition for exiting the measurement report event has been met in accordance with the measurement results on the first predetermined quantity of transmission beams; and an exit reporting module configured to, when the trigger condition for exiting the measurement report event has been met, cease to perform the measurement reporting operation.

In a possible embodiment of the present disclosure, the second acquisition module 603 may include a first acquisition sub-module configured to acquire a measurement result of a first predetermined reference signal on the first predetermined quantity of transmission beams in the serving cell where the terminal side device is located.

The trigger condition for entering the measurement reporting event may include a condition 1: Mx+Ox−Hys>Thresh1, and the trigger condition for exiting the measurement reporting event may include a condition 2: Mx+Ox+Hys<Thresh1 where Mx represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents a first threshold parameter of the measurement reporting event.

In a possible embodiment of the present disclosure, the second acquisition module 603 may include a first acquisition sub-module configured to acquire the measurement result of the first predetermined reference signal on the first predetermined quantity of transmission beams in the serving cell where the terminal side device is located.

The trigger condition for entering the measurement reporting event may include a condition 3: Mx+Ox−Hys>Mref+Oref+Off, and the trigger condition for exiting the measurement reporting event may include a condition 4: Mx+Ox+Hys<Mref+Oref+Off, where Mx represents the measurement result of the first predetermined reference signal x on the transmission beams in the serving cell, Ox represents a frequency-specific offset for x on the transmission beams in the serving cell, Hys represents a delay parameter of the measurement reporting event, Mref represents a measurement result of a reference x on the transmission beams in the serving cell, Oref represents a frequency-specific offset of the reference x on the transmission beams in the serving cell, and Off represents an offset parameter of the measurement reporting event.

In a possible embodiment of the present disclosure, the second acquisition module 603 may include a first acquisition sub-module configured to acquire the measurement result of the first predetermined reference signal on the first predetermined quantity of transmission beams in the serving cell where the terminal side device is located.

The trigger condition for entering the measurement reporting event may include a condition 5: Mx+Ox+Hys<Thresh1, and the trigger condition for exiting the measurement reporting event may include a condition 6: Mx+Ox−Hys>Thresh1, where Mx represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents the first threshold parameter of the measurement reporting event.

In a possible embodiment of the present disclosure, the second acquisition module 603 may include: a first acquisition sub-module configured to acquire the measurement result of the first predetermined reference signal on the first predetermined quantity of transmission beams in the serving cell where the terminal side device is located; and a second acquisition sub-module configured to acquire a measurement result of a second predetermined reference signal on the first predetermined quantity of transmission beams in the neighboring cell of the serving cell.

The trigger condition for entering the measurement reporting event may include a condition 7: Mn+Ofn+Ocn−Hys>Mp+Ofp+Ocp+Off, and the trigger condition for exiting the measurement reporting event may include a condition 8: Mn+Ofn+Ocn+Hys<Mp+Ofp+Ocp+Off, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, Mp represents the measurement result of the first predetermined reference signal x on the transmission beams in the serving cell, Ofp represents a frequency-specific offset of x on the transmission beams in the serving cell, Ocp represents a cell-specific offset of x on the transmission beams in the serving cell, and Off represents an offset parameter of the measurement reporting event.

In a possible embodiment of the present disclosure, the second acquisition module 603 may include a second acquisition sub-module configured to acquire the measurement result of the second predetermined reference signal on the first predetermined quantity of transmission beams in the neighboring cell of the serving cell where the terminal side device is located.

The trigger condition for entering the measurement reporting event may include a condition 9: Mn+Ofn+Ocn−Hys>Thresh2, and the trigger condition for exiting the measurement reporting event may include a condition 10: Mn+Ofn+Ocn+Hys<Thresh2, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, and Thresh2 represents a second threshold parameter of the measurement reporting event.

In a possible embodiment of the present disclosure, the second acquisition module 603 may include: a first acquisition sub-module configured to acquire the measurement result of the first predetermined reference signal on the first predetermined quantity of transmission beams in the serving cell where the terminal side device is located; and a second acquisition sub-module configured to acquire the measurement result of the second predetermined reference signal on the first predetermined quantity of transmission beams in the neighboring cell of the serving cell.

The trigger condition for entering the measurement reporting event may include a condition 11: Mx+Ox+Hys<Thresh1 and Mn+Ofn+Ocn−Hys>Thresh2, and the trigger condition for exiting the measurement reporting event may include a condition 12: Mx+Ox−Hys>Thresh1 and Mn+Ofn+Ocn+Hys<Thresh2, where Mc represents the measurement result of the first predetermined reference signal x on the transmission beams in the serving cell, Ox represents the frequency-specific offset for x on the transmission beams in the serving cell, Hys represents a delay parameter of the measurement reporting event, Thresh1 represents the first threshold parameter of the measurement reporting event, Mn represents the measurement result of the second predetermined reference signal y on the transmission beams in the neighboring cell of the serving cell, Ofn represents the frequency-specific offset for y on the transmission beams in the neighboring cell, Ocn represents the cell-specific offset for y on the transmission beams in the neighboring cell, and Thresh2 represents the second threshold parameter of the measurement reporting event.

In a possible embodiment of the present disclosure, the second acquisition module 603 may include a third acquisition sub-module configured to acquire the measurement results of the predetermined reference signal on the first predetermined quantity of transmissions beams received on each reception beam included in a reception antenna group of the terminal side device.

According to the terminal side device in the embodiments of the present disclosure, it is able to perform the measurement reporting operation in the multiple-beam scenario, i.e., to solve the problem in a conventional LTE system where multiple-beam measurement reporting is unavailable, thereby to improve the network performance.

Figure 7:
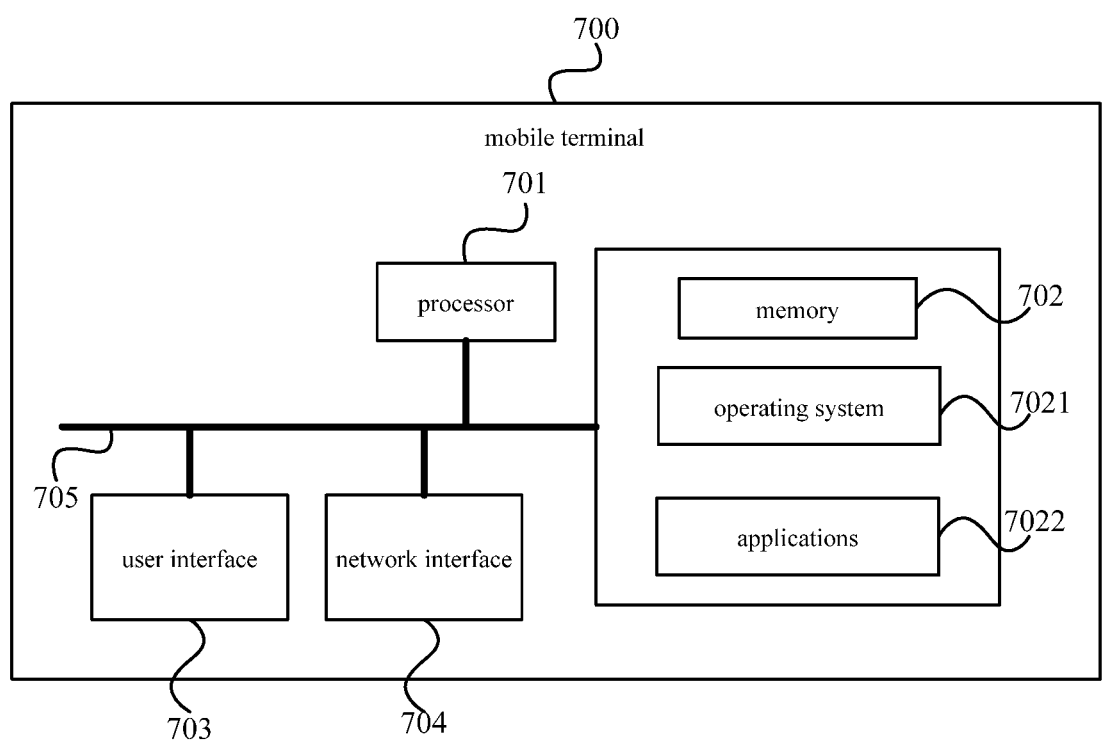
FIG. 7 is a schematic view showing a mobile terminal according to some embodiments of the present disclosure.

The present disclosure further provides in some embodiments a mobile terminal 700 which, as shown in FIG. 7, includes at least one processor 701, a memory 702, at least one network interface 704 and a user interface 703. The components of the mobile terminal 700 may be coupled together through a bus system 705. It should be appreciated that, the bus system 705 is configured to achieve connection and communication among the components. Apart from a data bus, the bus system 705 may further include a power source bus, a control bus and a state signal bus. For clarification, all these buses in FIG. 7 may be collectively called as bus system 705.

The user interface 703 may include a display, a keyboard or a pointing device (e.g., mouse, track ball, touch plate or touch panel).

It should be appreciated that, the memory 702 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 702 intends to include, but not limited to, the above-mentioned and any other appropriate memories.

In a possible embodiment of the present disclosure, the following elements may be stored in the memory 702: an executable module or data structure, a subset or an extended set thereof, an operating system 7021 and an application 7022.

The operating system 7021 may include various system programs, e.g., a framework layer, a core layer and a driving layer, so as to implement various basic services and process hardware-based tasks. The application 7022 may include various applications, e.g., Media Player and Browser, so as to implement various application services. The programs for implementing the above-mentioned method may be included in the application 7022.

In this embodiment, through calling a program or instruction stored in the memory 702, e.g., a program or instruction stored in the application 7022, the processor 701 is configured to: acquire measurement configuration information from a network side device; determine a first predetermined quantity of transmission beams in a plurality of transmission beams in accordance with the measurement configuration information, the first predetermined quantity of transmission beams being transmission beams to be adopted by the terminal side device in a connected state to perform predetermined reference signal measurement; acquire a measurement result of a predetermined reference signal on the first predetermined quantity of transmission beams; and perform a measurement reporting operation in accordance with the measurement result of the predetermined reference signal on the first predetermined quantity of transmission beams.

The above-mentioned method may be applied to, or implemented by, the processor 701. The processor 701 may be an integrated circuit (IC) having a signal processing capability. During the implementation, the steps of the above-mentioned method may be completed through an integrated logic circuit of hardware in the processor 701 or instructions in the form of software. The processor 701 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 702, and the processor 701 may read information stored in the memory 702 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the measurement configuration information may include the quantity of to-be-measured beams configured by the network side device for the terminal side device. The processor 701 is further configured to: when the configured quantity of the to-be-measured beams is smaller than a beam measurement quantity capability threshold of the terminal side device, determining the configured quantity of the to-be-measured beams as the first predetermined quantity; and when the configured quantity of the to-be-measured beams is greater than or equal to the beam measurement quantity capability threshold of the terminal side device, determining the beam measurement quantity capability threshold of the terminal side device as the first predetermined quantity.

In a possible embodiment of the present disclosure, the processor 701 is further configured to: acquire a measurement result of a first predetermined reference signal on the first predetermined quantity of transmission beams in a serving cell where the terminal side device is located; and/or acquire a measurement result of a second predetermined reference signal on the first predetermined quantity of transmission beams in a neighboring cell of the serving cell.

In a possible embodiment of the present disclosure, the first predetermined reference signal may include an xSS or a CSI-RS, or at least two of the xSS, the CSI-RS and a DMRS. The second predetermined reference signal may include an xSS or a CSI-RS, or at least two of the xSS, the CSI-RS and a DMRS. The xSS may include an SSS, or both a PSS and the SSS.

In a possible embodiment of the present disclosure, the measurement result may include at least one of RSRP, RSRQ and an RS-SINR.

In a possible embodiment of the present disclosure, the processor 701 is further configured to, upon the acquisition of the measurement result of the first predetermined reference signal on the first predetermined quantity of transmission beams in the serving cell where the terminal side device is located, determine cell quality of the serving cell in accordance with the measurement results on the first predetermined quantity of transmission beams, and report the cell quality of the serving cell.

In a possible embodiment of the present disclosure, the processor 701 is further configured to, upon the acquisition of the measurement result of the second predetermined reference signal on the first predetermined quantity of transmission beams in the neighboring cell of the serving cell, determine cell quality of the neighboring cell in accordance with the measurement results on the first predetermined quantity of transmission beams, and report the cell quality of the neighboring cell.

In a possible embodiment of the present disclosure, the processor 701 is further configured to: acquire a measurement result of a current-serving transmission beams in the measurement results on the first predetermined quantity of transmission beams, and determine the cell quality of the serving cell in accordance with the measurement result of the currently-serving transmission beam; or calculate the measurement results on the first predetermined quantity of transmission beams in accordance with a predetermined algorithm, and determine the cell quality of the serving cell in accordance with a calculation result; or acquire measurement results on transmission beams of a first type greater than a first predetermined threshold in the measurement results on the first predetermined quantity of transmission beams, calculate the measurement results on the transmission beams of the first type in accordance with the predetermined algorithm, and determine the cell quality of the serving cell in accordance with a calculation result. The predetermined algorithm may include a summation, averaging or weighting algorithm.

In a possible embodiment of the present disclosure, the processor 701 is further configured to: calculate the measurement results on the first predetermined quantity of transmission beams in accordance with a predetermined algorithm, and determine the cell quality of the neighboring cell in accordance with a calculation result; or acquire measurement results on transmission beams of a second type greater than the first predetermined threshold in the measurement results on the first predetermined quantity of transmission beams, calculate the measurement results on the transmission beams of the second type in accordance with a predetermined algorithm, and determine the cell quality of the neighboring cell in accordance with a calculation result. The predetermined algorithm may include a summation, averaging or weighting algorithm.

In a possible embodiment of the present disclosure, the processor 701 is further configured to: acquire reporting configuration information from the network side device, the reporting configuration information including the quantity of to-be-reported beams configured by the network side device for the terminal side device; and acquire measurement results on a second predetermined quantity of transmission beams in the measurement results on the first predetermined quantity of transmission beams in accordance with the reporting configuration information, and report the measurement results on the second predetermined quantity of transmission beams. The second predetermined quantity may be smaller than or equal to the first predetermined quantity.

In a possible embodiment of the present disclosure, the processor 701 is further configured to acquire a beam identity corresponding to each of the second predetermined quantity of transmission beams, and report the beam identity corresponding to each of the second predetermined quantity of transmission beams.

In a possible embodiment of the present disclosure, the processor 701 is further configured to: when the configured quantity of to-be-reported beams is smaller than the first predetermined quantity, determine the configured quantity of to-be-reported beams as the second predetermined quantity, and acquire the measurement results on the second predetermined quantity of transmission beams in the measurement results on the first predetermined quantity of transmission beams, each of the measurement results on the second predetermined quantity of transmission beams being greater than or equal to the measurement results on the transmission beams other than the second predetermined quantity of transmission beams; and when the configured quantity of to-be-reported beams is greater than or equal to the first predetermined quantity, determine the first predetermined quantity as the second predetermined quantity, and take the measurement results on the first predetermined quantity of transmission beams as the measurement results on the second predetermined quantity of transmission beams.

In a possible embodiment of the present disclosure, the processor 701 is further configured to: acquire measurement results on transmission beams of a third type greater than a second predetermined threshold in the measurement results on the first predetermined quantity of transmission beams; when the quantity of the transmission beams of the third type is smaller than the configured quantity of to-be-reported beams, determine the quantity of the transmission beams of the third type as the second predetermined quantity, and take the measurement results on the transmission beams of the third type as the measurement results on the second predetermined quantity of transmission beams; and when the quantity of the transmission beams of the third type is greater than or equal to the configured quantity of to-be-reported beams, determine the configured quantity of to-be-reported beams as the second predetermined quantity, and acquire the measurement results on the second predetermined quantity of transmission beams in the measurement results on the transmission beams of the third type.

In a possible embodiment of the present disclosure, the processor 701 is further configured to periodically perform the measurement reporting operation in accordance with the measurement results on the first predetermined quantity of transmission beams and a predetermined period.

In a possible embodiment of the present disclosure, the processor 701 is further configured to: judge whether a trigger condition for entering a measurement reporting event has been met in accordance with the measurement results on the first predetermined quantity of transmission beams; and when the trigger condition for entering the measurement reporting event has been met, perform the measurement reporting operation.

In a possible embodiment of the present disclosure, the processor 701 is further configured to judge whether a trigger condition for exiting the measurement report event has been met in accordance with the measurement results on the first predetermined quantity of transmission beams; and when the trigger condition for exiting the measurement report event has been met, cease to perform the measurement reporting operation.

In a possible embodiment of the present disclosure, the processor 701 is further configured to acquire a measurement result of a first predetermined reference signal on the first predetermined quantity of transmission beams in the serving cell where the terminal side device is located. The trigger condition for entering the measurement reporting event may include a condition 1: Mx+Ox−Hys>Thresh1, and the trigger condition for exiting the measurement reporting event may include a condition 2: Mx+Ox+Hys<Thresh1, where represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents a first threshold parameter of the measurement reporting event.

In a possible embodiment of the present disclosure, the processor 701 is further configured to acquire the measurement result of the first predetermined reference signal on the first predetermined quantity of transmission beams in the serving cell where the terminal side device is located. The trigger condition for entering the measurement reporting event may include a condition 3: Mx+Ox−Hys>Mref+Oref+Off, and the trigger condition for exiting the measurement reporting event may include a condition 4: Mx+Ox+Hys<Mref+Oref+Off, where Mx represents the measurement result of the first predetermined reference signal x on the transmission beams in the serving cell, Ox represents a frequency-specific offset for x on the transmission beams in the serving cell, Hys represents a delay parameter of the measurement reporting event, Mref represents a measurement result of a reference x on the transmission beams in the serving cell, Oref represents a frequency-specific offset of the reference x on the transmission beams in the serving cell, and Off represents an offset parameter of the measurement reporting event.

In a possible embodiment of the present disclosure, the processor 701 is further configured to acquire the measurement result of the first predetermined reference signal on the first predetermined quantity of transmission beams in the serving cell where the terminal side device is located. The trigger condition for entering the measurement reporting event may include a condition 5: Mx+Ox+Hys<Thresh1, and the trigger condition for exiting the measurement reporting event may include a condition 6: Mx+Ox−Hys>Thresh1, where Mx represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents the first threshold parameter of the measurement reporting event.

In a possible embodiment of the present disclosure, the processor 701 is further configured to: acquire the measurement result of the first predetermined reference signal on the first predetermined quantity of transmission beams in the serving cell where the terminal side device is located; and acquire a measurement result of a second predetermined reference signal on the first predetermined quantity of transmission beams in the neighboring cell of the serving cell. The trigger condition for entering the measurement reporting event may include a condition 7: Mn+Ofn+Ocn−Hys>Mp+Ofp+Ocp+Off, and the trigger condition for exiting the measurement reporting event may include a condition 8: Mn+Ofn+Ocn+Hys<Mp+Ofp+Ocp+Off, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, Mp represents the measurement result of the first predetermined reference signal x on the transmission beams in the serving cell, Ofp represents a frequency-specific offset of x on the transmission beams in the serving cell, Ocp represents a cell-specific offset of x on the transmission beams in the serving cell, and Off represents an offset parameter of the measurement reporting event.

In a possible embodiment of the present disclosure, the processor 701 is further configured to acquire the measurement result of the second predetermined reference signal on the first predetermined quantity of transmission beams in the neighboring cell of the serving cell where the terminal side device is located. The trigger condition for entering the measurement reporting event may include a condition 9: Mn+Ofn+Ocn−Hys>Thresh2, and the trigger condition for exiting the measurement reporting event may include a condition 10: Mn+Ofn+Ocn+Hys<Thresh2, where Mn represents the measurement result of the second predetermined reference signal y on the transmission beams in the neighboring cell of the serving cell, Ofn represents a frequency-specific offset for on the transmission beams in the neighboring cell, Ocn represents a cell-specific offset for y on the transmission beams in the neighboring cell, Hys represents a delay parameter of the measurement reporting event, and Thresh2 represents a second threshold parameter of the measurement reporting event.

In a possible embodiment of the present disclosure, the processor 701 is further configured to: acquire the measurement result of the first predetermined reference signal on the first predetermined quantity of transmission beams in the serving cell where the terminal side device is located; and acquire the measurement result of the second predetermined reference signal on the first predetermined quantity of transmission beams in the neighboring cell of the serving cell. The trigger condition for entering the measurement reporting event may include a condition 11: Mx+Ox+Hys<Thresh1 and Mn+Ofn+Ocn−Hys>Thresh2, and the trigger condition for exiting the measurement reporting event may include a condition 12: Mx+Ox−Hys>Thresh1 and Mn+Ofn+Ocn+Hys<Thresh2, where Mx represents the measurement result of the first predetermined reference signal x on the transmission beams in the serving cell, Ox represents the frequency-specific offset for x on the transmission beams in the serving cell, Hys represents a delay parameter of the measurement reporting event, Thresh1 represents the first threshold parameter of the measurement reporting event, Mn represents the measurement result of the second predetermined reference signal y on the transmission beams in the neighboring cell of the serving cell, Ofn represents the frequency-specific offset for y on the transmission beams in the neighboring cell, Ocn represents the cell-specific offset for y on the transmission beams in the neighboring cell, and Thresh2 represents the second threshold parameter of the measurement reporting event.

In a possible embodiment of the present disclosure, the processor 701 is further configured to acquire the measurement results of the predetermined reference signal on the first predetermined quantity of transmissions beams received on each reception beam included in a reception antenna group of the terminal side device.

The mobile terminal 700 is capable of implementing the procedures implemented by the terminal side device as mentioned hereinabove, which will thus not be particularly defined herein. According to the mobile terminal 700 in the embodiments of the present disclosure, it is able to perform the measurement reporting operation in the multiple-beam scenario, i.e., to solve the problem in a conventional LTE system where multiple-beam measurement reporting is unavailable, thereby to improve the network performance.

Figure 8:
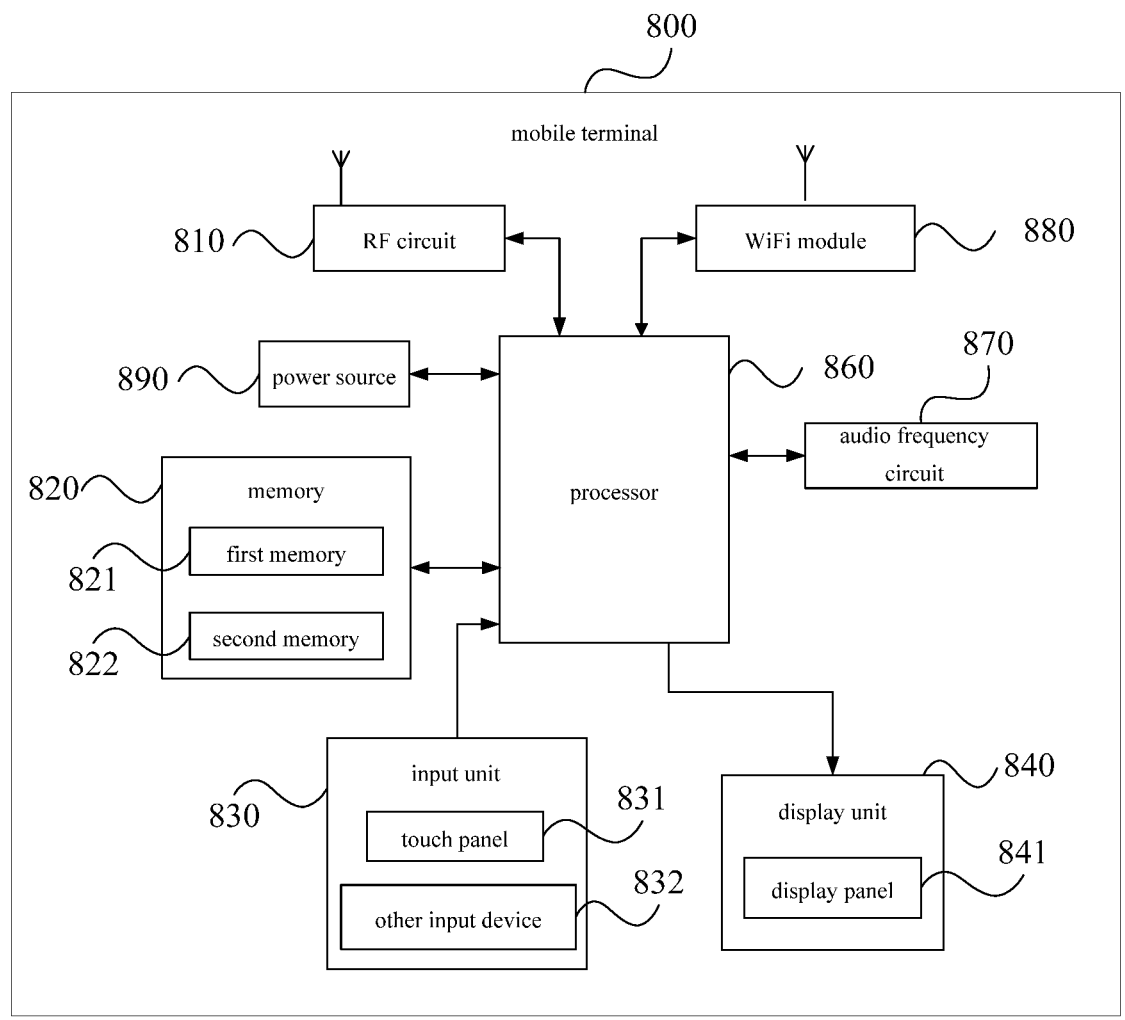
FIG. 8 is another schematic view showing the mobile terminal according to some embodiments of the present disclosure.
Figure 9:
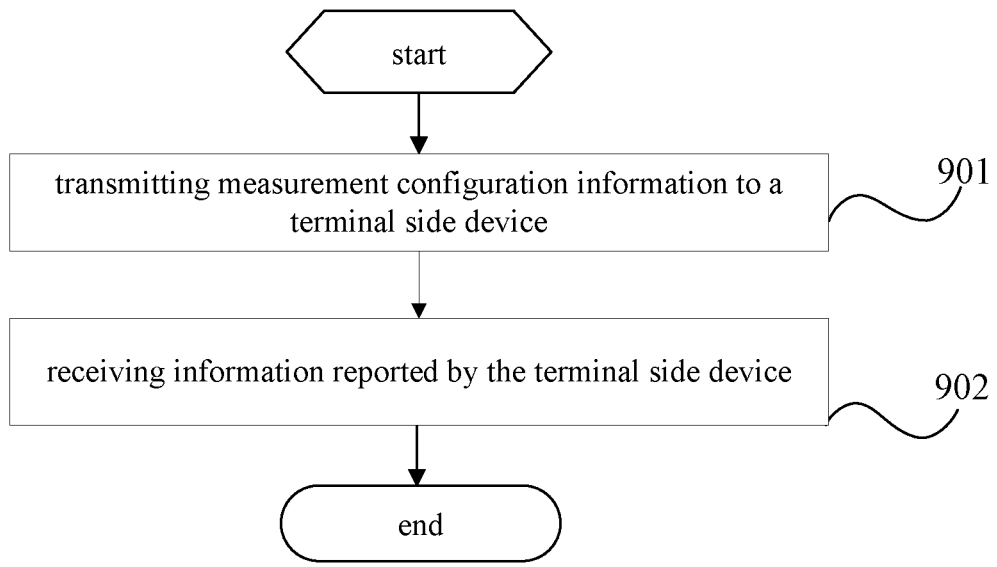
FIG. 9 is a flow chart of a beam measurement reporting method for a network side device according to some embodiments of the present disclosure.

As shown in FIG. 8, the present disclosure further provides in some embodiments a mobile terminal 800. The mobile terminal 800 may be a mobile phone, a flat-panel computer, a PDA, or a vehicle-mounted computer.

As shown in FIG. 8, the mobile terminal 800 includes a Radio Frequency (RF) circuit 810, a memory 820, an input unit 830, a display unit 840, a processor 860, an audio frequency circuit 870, a Wireless Fidelity (WiFi) module 880, and a power source 890.

The input unit 830 is configured to receive digital or character information inputted by a user, and generate a signal input related to user settings and function control of the mobile terminal 800. To be specific, the input unit 830 may include a touch panel 831. The touch panel 831, also called as touch screen, is configured to collect a touch operation made by the user on or in proximity to the touch panel (e.g., an operation made by the user through any appropriate object or attachment (e.g., finger or stylus) on or in the proximity to the touch panel 831). The touch panel 831 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 860, and receive and execute a command from the processor 860. In addition, the touch panel 831 may be of a resistive type, a capacitive type, an infrared type or a surface acoustic wave (SAW) type. Apart from the touch panel 831, the input unit 830 may further include an input device 832 which may include, but not limited to, a physical keyboard, a functional button (e.g., a volume control button or an on/off button), a trackball, a mouse, and a joystick, which will not be particularly defined herein.

The display unit 840 is configured to display information inputted by the user or information to be presented to the user, and various interfaces for the mobile terminal 800, and it may include a display panel 841. In a possible embodiment of the present disclosure, the display panel 841 may be a Liquid Crystal Display (LCD) panel or an Organic Light-Emitting Diode (OLED) panel.

It should be appreciated that, the touch panel 831 may cover the display panel 841, so as to form a touch display panel. When the touch operation made on or in proximity to the touch display panel has been detected, the touch information may be transmitted to the processor 860 so as to determine a type of a touch event. Then, the processor 860 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 860 may be a control center of the mobile terminal 800, and connected to each member of the entire mobile terminal via various interfaces and lines. The processor 860 is configured to run or execute software programs and/or modules stored in a first memory 821, and call data stored in a second memory 822, so as to achieve various functions of the mobile terminal 800 and process the data, thereby to monitor the mobile terminal 800. In a possible embodiment of the present disclosure, the processor 860 may include one or more processing units.

In the embodiments of the present disclosure, through calling a program or instruction stored in the first memory 821 and/or the data stored in the second memory 822, the processor 860 is configured to: acquire measurement configuration information from a network side device; determine a first predetermined quantity of transmission beams in a plurality of transmission beams in accordance with the measurement configuration information, the first predetermined quantity of transmission beams being transmission beams to be adopted by the terminal side device in a connected state to perform predetermined reference signal measurement; acquire a measurement result of a predetermined reference signal on the first predetermined quantity of transmission beams; and perform a measurement reporting operation in accordance with the measurement result of the predetermined reference signal on the first predetermined quantity of transmission beams.

In a possible embodiment of the present disclosure, the measurement configuration information may include the quantity of to-be-measured beams configured by the network side device for the terminal side device. The processor 860 is further configured to: when the configured quantity of the to-be-measured beams is smaller than a beam measurement quantity capability threshold of the terminal side device, determining the configured quantity of the to-be-measured beams as the first predetermined quantity; and when the configured quantity of the to-be-measured beams is greater than or equal to the beam measurement quantity capability threshold of the terminal side device, determining the beam measurement quantity capability threshold of the terminal side device as the first predetermined quantity.

In a possible embodiment of the present disclosure, the processor 860 is further configured to: acquire a measurement result of a first predetermined reference signal on the first predetermined quantity of transmission beams in a serving cell where the terminal side device is located; and/or acquire a measurement result of a second predetermined reference signal on the first predetermined quantity of transmission beams in a neighboring cell of the serving cell.

In a possible embodiment of the present disclosure, the first predetermined reference signal may include an xSS or a CSI-RS, or at least two of the xSS, the CSI-RS and a DMRS. The second predetermined reference signal may include an xSS or a CSI-RS, or at least two of the xSS, the CSI-RS and a DMRS. The xSS may include an SSS, or both a PSS and the SSS.

In a possible embodiment of the present disclosure, the measurement result may include at least one of RSRP, RSRQ and an RS-SINR.

In a possible embodiment of the present disclosure, the processor 860 is further configured to, upon the acquisition of the measurement result of the first predetermined reference signal on the first predetermined quantity of transmission beams in the serving cell where the terminal side device is located, determine cell quality of the serving cell in accordance with the measurement results on the first predetermined quantity of transmission beams, and report the cell quality of the serving cell.

In a possible embodiment of the present disclosure, the processor 860 is further configured to, upon the acquisition of the measurement result of the first predetermined reference signal on the first predetermined quantity of transmission beams in the serving cell where the terminal side device is located, determine cell quality of the serving cell in accordance with the measurement results on the first predetermined quantity of transmission beams, and report the cell quality of the serving cell.

In a possible embodiment of the present disclosure, the processor 860 is further configured to: acquire a measurement result of a current-serving transmission beams in the measurement results on the first predetermined quantity of transmission beams, and determine the cell quality of the serving cell in accordance with the measurement result of the currently-serving transmission beam; or calculate the measurement results on the first predetermined quantity of transmission beams in accordance with a predetermined algorithm, and determine the cell quality of the serving cell in accordance with a calculation result; or acquire measurement results on transmission beams of a first type greater than a first predetermined threshold in the measurement results on the first predetermined quantity of transmission beams, calculate the measurement results on the transmission beams of the first type in accordance with the predetermined algorithm, and determine the cell quality of the serving cell in accordance with a calculation result. The predetermined algorithm may include a summation, averaging or weighting algorithm.

In a possible embodiment of the present disclosure, the processor 860 is further configured to: calculate the measurement results on the first predetermined quantity of transmission beams in accordance with a predetermined algorithm, and determine the cell quality of the neighboring cell in accordance with a calculation result; or acquire measurement results on transmission beams of a second type greater than the first predetermined threshold in the measurement results on the first predetermined quantity of transmission beams, calculate the measurement results on the transmission beams of the second type in accordance with a predetermined algorithm, and determine the cell quality of the neighboring cell in accordance with a calculation result. The predetermined algorithm may include a summation, averaging or weighting algorithm.

In a possible embodiment of the present disclosure, the processor 860 is further configured to: acquire reporting configuration information from the network side device, the reporting configuration information including the quantity of to-be-reported beams configured by the network side device for the terminal side device; and acquire measurement results on a second predetermined quantity of transmission beams in the measurement results on the first predetermined quantity of transmission beams in accordance with the reporting configuration information, and report the measurement results on the second predetermined quantity of transmission beams. The second predetermined quantity may be smaller than or equal to the first predetermined quantity.

In a possible embodiment of the present disclosure, the processor 860 is further configured to acquire a beam identity corresponding to each of the second predetermined quantity of transmission beams, and report the beam identity corresponding to each of the second predetermined quantity of transmission beams.

In a possible embodiment of the present disclosure, the processor 860 is further configured to: when the configured quantity of to-be-reported beams is smaller than the first predetermined quantity, determine the configured quantity of to-be-reported beams as the second predetermined quantity, and acquire the measurement results on the second predetermined quantity of transmission beams in the measurement results on the first predetermined quantity of transmission beams, each of the measurement results on the second predetermined quantity of transmission beams being greater than or equal to the measurement results on the transmission beams other than the second predetermined quantity of transmission beams; and when the configured quantity of to-be-reported beams is greater than or equal to the first predetermined quantity, determine the first predetermined quantity as the second predetermined quantity, and take the measurement results on the first predetermined quantity of transmission beams as the measurement results on the second predetermined quantity of transmission beams.

In a possible embodiment of the present disclosure, the processor 860 is further configured to: acquire measurement results on transmission beams of a third type greater than a second predetermined threshold in the measurement results on the first predetermined quantity of transmission beams; when the quantity of the transmission beams of the third type is smaller than the configured quantity of to-be-reported beams, determine the quantity of the transmission beams of the third type as the second predetermined quantity, and take the measurement results on the transmission beams of the third type as the measurement results on the second predetermined quantity of transmission beams; and when the quantity of the transmission beams of the third type is greater than or equal to the configured quantity of to-be-reported beams, determine the configured quantity of to-be-reported beams as the second predetermined quantity, and acquire the measurement results on the second predetermined quantity of transmission beams in the measurement results on the transmission beams of the third type.

In a possible embodiment of the present disclosure, the processor 860 is further configured to periodically perform the measurement reporting operation in accordance with the measurement results on the first predetermined quantity of transmission beams and a predetermined period.

In a possible embodiment of the present disclosure, the processor 860 is further configured to: judge whether a trigger condition for entering a measurement reporting event has been met in accordance with the measurement results on the first predetermined quantity of transmission beams; and when the trigger condition for entering the measurement reporting event has been met, perform the measurement reporting operation.

In a possible embodiment of the present disclosure, the processor 860 is further configured to judge whether a trigger condition for exiting the measurement report event has been met in accordance with the measurement results on the first predetermined quantity of transmission beams; and when the trigger condition for exiting the measurement report event has been met, cease to perform the measurement reporting operation.

In a possible embodiment of the present disclosure, the processor 860 is further configured to acquire a measurement result of a first predetermined reference signal on the first predetermined quantity of transmission beams in the serving cell where the terminal side device is located. The trigger condition for entering the measurement reporting event may include a condition 1: Mx+Ox−Hys>Thresh1, and the trigger condition for exiting the measurement reporting event may include a condition 2: Mx+Ox+Hys<Thresh1, where Mx represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents a first threshold parameter of the measurement reporting event.

In a possible embodiment of the present disclosure, the processor 860 is further configured to acquire the measurement result of the first predetermined reference signal on the first predetermined quantity of transmission beams in the serving cell where the terminal side device is located. The trigger condition for entering the measurement reporting event may include a condition 3: Mx+Ox−Hys>Mref+Oref+Off, and the trigger condition for exiting the measurement reporting event may include a condition 4: Mx+Ox+Hys<Mref+Oref+Off, where Mx represents the measurement result of the first predetermined reference signal x on the transmission beams in the serving cell, Ox represents a frequency-specific offset for x on the transmission beams in the serving cell, Hys represents a delay parameter of the measurement reporting event, Mref represents a measurement result of a reference x on the transmission beams in the serving cell, Oref represents a frequency-specific offset of the reference x on the transmission beams in the serving cell, and Off represents an offset parameter of the measurement reporting event.

In a possible embodiment of the present disclosure, the processor 860 is further configured to acquire the measurement result of the first predetermined reference signal on the first predetermined quantity of transmission beams in the serving cell where the terminal side device is located. The trigger condition for entering the measurement reporting event may include a condition 5: Mx+Ox+Hys<Thresh1, and the trigger condition for exiting the measurement reporting event may include a condition 6: Mx+Ox−Hys>Thresh1, where Mx represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents the first threshold parameter of the measurement reporting event.

In a possible embodiment of the present disclosure, the processor 860 is further configured to: acquire the measurement result of the first predetermined reference signal on the first predetermined quantity of transmission beams in the serving cell where the terminal side device is located; and acquire a measurement result of a second predetermined reference signal on the first predetermined quantity of transmission beams in the neighboring cell of the serving cell. The trigger condition for entering the measurement reporting event may include a condition 7: Mn+Ofn+Ocn−Hys>Mp+Ofp+Ocp+Off, and the trigger condition for exiting the measurement reporting event may include a condition 8: Mn+Ofn+Ocn+Hys<Mp+Ofp+Ocp+Off, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, Mp represents the measurement result of the first predetermined reference signal x on the transmission beams in the serving cell, Ofp represents a frequency-specific offset of x on the transmission beams in the serving cell, Ocp represents a cell-specific offset of x on the transmission beams in the serving cell, and Off represents an offset parameter of the measurement reporting event.

In a possible embodiment of the present disclosure, the processor 860 is further configured to acquire the measurement result of the second predetermined reference signal on the first predetermined quantity of transmission beams in the neighboring cell of the serving cell where the terminal side device is located. The trigger condition for entering the measurement reporting event may include a condition 9: Mn+Ofn+Ocn−Hys>Thresh2, and the trigger condition for exiting the measurement reporting event may include a condition 10: Mn+Ofn+Ocn+Hys<Thresh2, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, and Thresh2 represents a second threshold parameter of the measurement reporting event.

In a possible embodiment of the present disclosure, the processor 860 is further configured to: acquire the measurement result of the first predetermined reference signal on the first predetermined quantity of transmission beams in the serving cell where the terminal side device is located; and acquire the measurement result of the second predetermined reference signal on the first predetermined quantity of transmission beams in the neighboring cell of the serving cell. The trigger condition for entering the measurement reporting event may include a condition 11: Mx+Ox+Hys<Thresh1 and Mn+Ofn+Ocn−Hys>Thresh2, and the trigger condition for exiting the measurement reporting event may include a condition 12: Mx+Ox−Hys>Thresh1 and Mn+Ofn+Ocn+Hys<Thresh2, where Mx represents the measurement result of the first predetermined reference signal x on the transmission beams in the serving cell, Ox represents the frequency-specific offset for x on the transmission beams in the serving cell, Hys represents a delay parameter of the measurement reporting event, Thresh1 represents the first threshold parameter of the measurement reporting event, Mn represents the measurement result of the second predetermined reference signal y on the transmission beams in the neighboring cell of the serving cell, Ofn represents the frequency-specific offset for y on the transmission beams in the neighboring cell, Ocn represents the cell-specific offset for y on the transmission beams in the neighboring cell, and Thresh2 represents the second threshold parameter of the measurement reporting event.

In a possible embodiment of the present disclosure, the processor 860 is further configured to acquire the measurement results of the predetermined reference signal on the first predetermined quantity of transmissions beams received on each reception beam included in a reception antenna group of the terminal side device.

According to the mobile terminal 800 in the embodiments of the present disclosure, it is able to perform the measurement reporting operation in the multiple-beam scenario, i.e., to solve the problem in a conventional LTE system where multiple-beam measurement reporting is unavailable, thereby to improve the network performance.

The present disclosure further provides in some embodiments a computer-program storage medium storing therein a computer program. The computer program is executed by the processor, so as to: acquire measurement configuration information from a network side device; determine a first predetermined quantity of transmission beams in a plurality of transmission beams in accordance with the measurement configuration information, the first predetermined quantity of transmission beams being transmission beams to be adopted by the terminal side device in a connected state to perform predetermined reference signal measurement; acquire a measurement result of a predetermined reference signal on the first predetermined quantity of transmission beams; and perform a measurement reporting operation in accordance with the measurement result of the predetermined reference signal on the first predetermined quantity of transmission beams.

The present disclosure further provides in some embodiments a beam measurement reporting method for a network side device. As shown in FIG. 8, the beam measurement reporting method includes Step 901 of transmitting measurement configuration information to a terminal side device, so as to enable the terminal side device to determine a first predetermined quantity of transmission beams in a plurality of transmission beams in accordance with the measurement configuration information, acquire a measurement result of a predetermined reference signal on the first predetermined quantity of transmission beams, and perform a measurement reporting operation in accordance with the measurement result of the predetermined reference signal on the first predetermined quantity of transmission beams.

Here, the terminal side device may determine the first predetermined quantity of transmission beams in the plurality of transmission beams in accordance with the measurement configuration information, acquire the measurement result of the predetermined reference signal on the first predetermined quantity of transmission beams, and perform the measurement reporting operation in accordance with the measurement result of the predetermined reference signal on the first predetermined quantity of transmission beams. In this way, it is able to perform the beam measurement reporting operation in the multiple-beam scenario.

According to the beam measurement reporting method in the embodiments of the present disclosure, the measurement configuration information may be transmitted to the terminal side device, so as to enable the terminal side device to perform the beam measurement reporting operation in the multiple-beam scenario in accordance with the measurement configuration information. As a result, it is able to perform the measurement reporting operation in the multiple-beam scenario, i.e., to solve the problem in the conventional LTE system where the multiple-beam measurement reporting operation is unavailable, thereby to improve the network performance.

In a possible embodiment of the present disclosure, the measurement configuration information may include the quantity of to-be-measured beams configured by the network side device for the terminal side device.

Here, the network side device may configure the quantity Np1 of the to-be-measured beams for the terminal side device, so as to facilitate the subsequent determination of the to-be-measured beams by the terminal side device, thereby to enable the terminal side device to measure the beams in the multiple-beam scenario.

The network side device may configure the measurement of several beams for the terminal side device through Si or a dedicated RRC message, i.e., the measurement configuration information may be included in the SI or the dedicated RRC message.

In a possible embodiment of the present disclosure, the beam measurement reporting method may further include transmitting reporting configuration information to the terminal side device, and the reporting configuration information may include the quantity of to-be-reported beams configured by the network side device for the terminal side device.

Here, the network side device may configure the quantity Np2 of the to-be-reported beams for the terminal side device, so as to facilitate the determination of the to-be-reported beams by the terminal side device, thereby to enable the terminal side device to report the beam measurement result in the multiple-beam scenario.

The network side device may configure the reporting of several beams for the terminal side device through the SI or the dedicated RRC message, i.e., the reporting configuration message may be included in the SI or the dedicated RRC message.

In a possible embodiment of the present disclosure, subsequent to Step 901, the beam measurement reporting method may further include Step 902 of receiving information reported by the terminal side device.

Here, the terminal side device may acquire the measurement results on the first predetermined quantity of transmission beams in accordance with the measurement configuration information, and report cell quality and/or the beam measurement result in accordance with the measurement results on the first predetermined quantity of transmission beams.

According to the beam measurement reporting method in the embodiments of the present disclosure, the network side device may transmit the measurement configuration information to the terminal side device, so as to enable the terminal side device to perform the measurement reporting operation in the multiple-beam scenario in accordance with the measurement configuration information, i.e., solve the problem in a conventional LTE system where multiple-beam measurement reporting is unavailable, thereby to improve the network performance.

Figure 10:
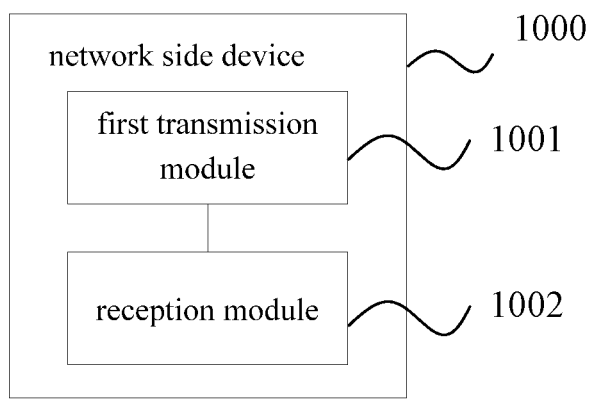
FIG. 10 is a schematic view showing a network side device according to some embodiments of the present disclosure.

The present disclosure further provides in some embodiments a network side device 1000 which, as shown in FIG. 10, includes a first transmission module 1001 configured to transmit measurement configuration information to a terminal side device, so as to enable the terminal side device to determine a first predetermined quantity of transmission beams in a plurality of transmission beams in accordance with the measurement configuration information, acquire a measurement result of a predetermined reference signal on the first predetermined quantity of transmission beams, and perform a measurement reporting operation in accordance with the measurement result of the predetermined reference signal on the first predetermined quantity of transmission beams.

According to the network side device 1000 in the embodiments of the present disclosure, the network side device may transmit the measurement configuration information to the terminal side device, so as to enable the terminal side device to perform the measurement reporting operation in the multiple-beam scenario in accordance with the measurement configuration information, i.e., solve the problem in a conventional LTE system where multiple-beam measurement reporting is unavailable, thereby to improve the network performance.

In a possible embodiment of the present disclosure, the measurement configuration information may include the quantity of to-be-measured beams configured by the network side device for the terminal side device.

In a possible embodiment of the present disclosure, the network side device 1000 may further include a second transmission module configured to transmit reporting configuration information to the terminal side device, and the reporting configuration information may include the quantity of to-be-reported beams configured by the network side device for the terminal side device.

In a possible embodiment of the present disclosure, the network side device 1000 may further include a reception module 1002 configured to receive information reported by the terminal side device.

According to the network side device 1000 in the embodiments of the present disclosure, the network side device may transmit the measurement configuration information to the terminal side device, so as to enable the terminal side device to perform the measurement reporting operation in the multiple-beam scenario in accordance with the measurement configuration information, i.e., solve the problem in a conventional LTE system where multiple-beam measurement reporting is unavailable, thereby to improve the network performance.

Figure 11:
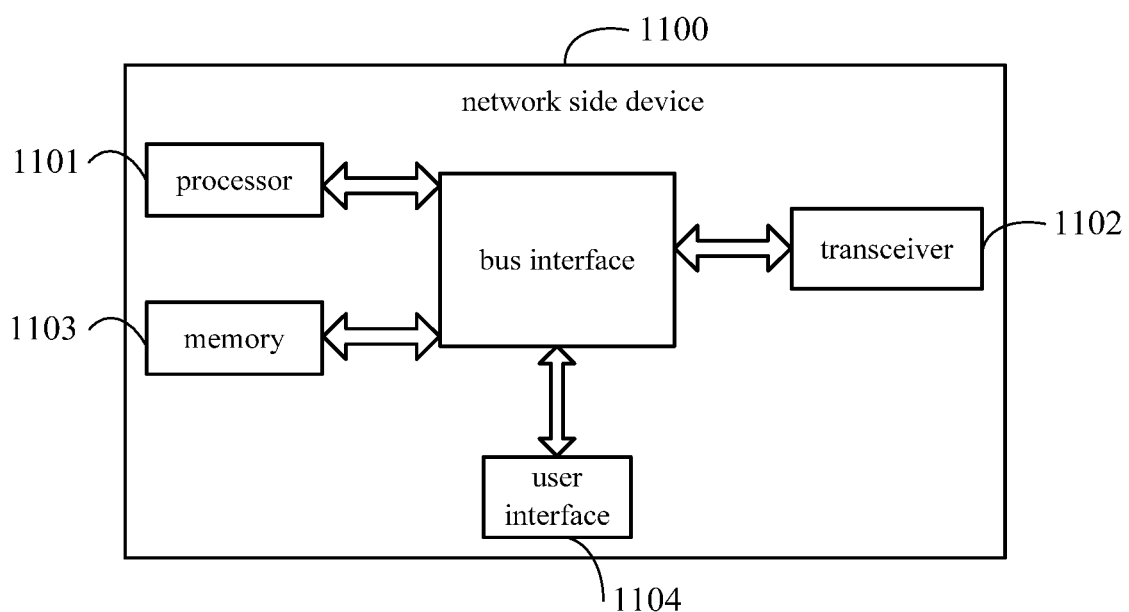
FIG. 11 is another schematic view showing the network side device according to some embodiments of the present disclosure.

The present disclosure further provides in some embodiments a network side device 1100 which, as shown in FIG. 11, includes a processor 1101, a transceiver 1102, a memory 1103 and a bus interface. The processor 1101 is configured to read a program stored in the memory 1103, so as to transmit, through the transceiver 1102, measurement configuration information to a terminal side device, so as to enable the terminal side device to determine a first predetermined quantity of transmission beams in a plurality of transmission beams in accordance with the measurement configuration information, acquire a measurement result of a predetermined reference signal on the first predetermined quantity of transmission beams, and perform a measurement reporting operation in accordance with the measurement result of the predetermined reference signal on the first predetermined quantity of transmission beams.

In FIG. 11, bus architecture may include a number of buses and bridges connected to each other, so as to connect various circuits for one or more processors 1101 and one or more memories 1103. In addition, as is known in the art, the bus architecture may be used to connect any other circuits, such as a circuit for a peripheral device, a circuit for a voltage stabilizer and a power management circuit. The bus interface may be provided, and the transceiver 1102 may consist of a plurality of elements, i.e., a transmitter and a receiver for communication with any other devices over a transmission medium. The processor 1101 may take charge of managing the bus architecture as well as general processings. The memory 1103 may store therein data for the operation of the processor 1101.

In a possible embodiment of the present disclosure, the measurement configuration information may include the quantity of to-be-measured beams configured by the network side device for the terminal side device.

In a possible embodiment of the present disclosure, the processor 1101 is further configured to transmit reporting configuration information to the terminal side device, and the reporting configuration information may include the quantity of to-be-reported beams configured by the network side device for the terminal side device.

In a possible embodiment of the present disclosure, the processor 1101 is further configured to receive through the transceiver information reported by the terminal side device.

According to the network side device 1100 in the embodiments of the present disclosure, the network side device may transmit the measurement configuration information to the terminal side device, so as to enable the terminal side device to perform the measurement reporting operation in the multiple-beam scenario in accordance with the measurement configuration information, i.e., solve the problem in a conventional LTE system where multiple-beam measurement reporting is unavailable, thereby to improve the network performance.

The present disclosure further provides in some embodiments a computer-readable storage medium storing therein a computer program. The computer program is executed by a processor so as to transmit measurement configuration information to a terminal side device, so as to enable the terminal side device to determine a first predetermined quantity of transmission beams in a plurality of transmission beams in accordance with the measurement configuration information, acquire a measurement result of a predetermined reference signal on the first predetermined quantity of transmission beams, and perform a measurement reporting operation in accordance with the measurement result of the predetermined reference signal on the first predetermined quantity of transmission beams.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A beam measurement reporting method for a terminal side device, comprising:
    acquiring measurement configuration information from a network side device;
    determining a first predetermined quantity of transmission beams in a plurality of transmission beams in accordance with the measurement configuration information, the first predetermined quantity of transmission beams being transmission beams to be used by the terminal side device in a connected state to perform predetermined reference signal measurement;
    acquiring a measurement result of a predetermined reference signal on the first predetermined quantity of transmission beams; and
    performing a measurement reporting operation in accordance with the measurement result of the predetermined reference signal on the first predetermined quantity of transmission beams,
    wherein the acquiring the measurement result of the predetermined reference signal on the first predetermined quantity of transmission beams comprises:
    acquiring a measurement result of a first predetermined reference signal on the first predetermined quantity of transmission beams in a serving cell where the terminal side device is located; and/or
    acquiring a measurement result of a second predetermined reference signal on the first predetermined quantity of transmission beams in a neighboring cell of the serving cell.

2. The beam measurement reporting method according to claim 1, wherein the measurement configuration information comprises the quantity of to-be-measured beams configured by the network side device for the terminal side device,
    wherein the determining the first predetermined quantity of transmission beams in the plurality of transmission beams in accordance with the measurement configuration information comprises:
    when the configured quantity of the to-be-measured beams is smaller than a beam measurement quantity capability threshold of the terminal side device, determining the configured quantity of the to-be-measured beams as the first predetermined quantity; and
    when the configured quantity of the to-be-measured beams is greater than or equal to the beam measurement quantity capability threshold of the terminal side device, determining the beam measurement quantity capability threshold of the terminal side device as the first predetermined quantity.

3. The beam measurement reporting method according to claim 1, wherein the first predetermined reference signal comprises an xSS or a Channel State Information-Reference Signal (CSI-RS), or at least two of the xSS, the CSI-RS and a Demodulation Reference Signal (DMRS), wherein the second predetermined reference signal comprises an xSS or a CSI-RS, or at least two of the xSS, the CSI-RS and a DMRS, wherein the xSS comprises an Secondary Synchronization Signal (SSS), or both a Primary Synchronization Signal (PSS) and the SSS.

4. The beam measurement reporting method according to claim 1, wherein the measurement result comprises at least one of Reference Signal Received Power (RSRP), Reference Signal Received Quality (RSRQ) and a Reference Signal-Signal to Interference plus Noise Ratio (RS-SINR).

5. The beam measurement reporting method according to claim 1, wherein when the acquiring the measurement result of the predetermined reference signal on the first predetermined quantity of transmission beams comprises acquiring the measurement result of the first predetermined reference signal on the first predetermined quantity of transmission beams in the serving cell where the terminal side device is located, the performing the measurement reporting operation in accordance with the measurement result of the predetermined reference signal on the first predetermined quantity of transmission beams comprises determining cell quality of the serving cell in accordance with the measurement result of the predetermined reference signal on the first predetermined quantity of transmission beams, and reporting the cell quality of the serving cell; or
    wherein when the acquiring the measurement result of the predetermined reference signal on the first predetermined quantity of transmission beams comprises acquiring the measurement result of the second predetermined reference signal on the first predetermined quantity of transmission beams in the neighboring cell of the serving cell, the performing the measurement reporting operation in accordance with the measurement result of the predetermined reference signal on the first predetermined quantity of transmission beams comprises determining cell quality of the neighboring cell in accordance with the measurement result of the predetermined reference signal on the first predetermined quantity of transmission beams, and reporting the cell quality of the neighboring cell.

6. The beam measurement reporting method according to claim 5, wherein the determining the cell quality of the serving cell in accordance with the measurement result of the predetermined reference signal on the first predetermined quantity of transmission beams comprises:

acquiring a measurement result of a current-serving transmission beams in the measurement results on the first predetermined quantity of transmission beams, and determining the cell quality of the serving cell in accordance with the measurement result of the currently-serving transmission beam; or calculating the measurement results on the first predetermined quantity of transmission beams in accordance with a predetermined algorithm, and determining the cell quality of the serving cell in accordance with a calculation result; or acquiring measurement results on transmission beams of a first type greater than a first predetermined threshold in the measurement results on the first predetermined quantity of transmission beams, calculating the measurement results on the transmission beams of the first type in accordance with the predetermined algorithm, and determining the cell quality of the serving cell in accordance with a calculation result, wherein the predetermined algorithm comprises a summation, averaging or weighting algorithm, or wherein the determining the cell quality of the neighboring cell in accordance with the measurement result of the predetermined reference signal on the first predetermined quantity of transmission beams comprises:

calculating the measurement results on the first predetermined quantity of transmission beams in accordance with a predetermined algorithm, and determining the cell quality of the neighboring cell in accordance with a calculation result; or acquiring measurement results on transmission beams of a second type greater than the first predetermined threshold in the measurement results on the first predetermined quantity of transmission beams, calculating the measurement results on the transmission beams of the second type in accordance with a predetermined algorithm, and determining the cell quality of the neighboring cell in accordance with a calculation result, wherein the predetermined algorithm comprises a summation, averaging or weighting algorithm.

7. The beam measurement reporting method according to claim 1, wherein the performing the measurement reporting operation in accordance with the measurement result of the predetermined reference signal on the first predetermined quantity of transmission beams comprises:

acquiring reporting configuration information from the network side device, the reporting configuration information comprising the quantity of to-be-reported beams configured by the network side device for the terminal side device; and acquiring measurement results on a second predetermined quantity of transmission beams in the measurement results on the first predetermined quantity of transmission beams in accordance with the reporting configuration information, and reporting the measurement results on the second predetermined quantity of transmission beams, wherein the second predetermined quantity is smaller than or equal to the first predetermined quantity.

8. The beam measurement reporting method according to claim 7, wherein the performing the measurement reporting operation in accordance with the measurement result of the predetermined reference signal on the first predefined quantity of transmission beams further comprises acquiring a beam identity corresponding to each of the second predetermined quantity of transmission beams, and reporting the beam identity corresponding to each of the second predetermined quantity of transmission beams.

9. The beam measurement reporting method according to claim 7, wherein the acquiring the measurement result on the second predetermined quantity of transmission beams in the measurement results on the first predetermined quantity of transmission beams in accordance with the reporting configuration information comprises:

when the configured quantity of to-be-reported beams is smaller than the first predetermined quantity, determining the configured quantity of to-be-reported beams as the second predetermined quantity, and acquiring the measurement results on the second predetermined quantity of transmission beams in the measurement results on the first predetermined quantity of transmission beams, each of the measurement results on the second predetermined quantity of transmission beams being greater than or equal to the measurement results on the transmission beams other than the second predetermined quantity of transmission beams; and when the configured quantity of to-be-reported beams is greater than or equal to the first predetermined quantity, determining the first predetermined quantity as the second predetermined quantity, and taking the measurement results on the first predetermined quantity of transmission beams as the measurement results on the second predetermined quantity of transmission beams, or wherein the acquiring the measurement result on the second predetermined quantity of transmission beams in the measurement results on the first predetermined quantity of transmission beams in accordance with the reporting configuration information comprises:

acquiring measurement results on transmission beams of a third type greater than a second predetermined threshold in the measurement results on the first predetermined quantity of transmission beams;

when the quantity of the transmission beams of the third type is smaller than the configured quantity of to-be-reported beams, determining the quantity of the transmission beams of the third type as the second predetermined quantity, and taking the measurement results on the transmission beams of the third type as the measurement results on the second predetermined quantity of transmission beams; and when the quantity of the transmission beams of the third type is greater than or equal to the configured quantity of to-be-reported beams, determining the configured quantity of to-be-reported beams as the second predetermined quantity, and acquiring the measurement results on the second predetermined quantity of transmission beams in the measurement results on the transmission beams of the third type.

10. The beam measurement reporting method according to claim 1, wherein the performing the measurement reporting operation in accordance with the measurement result of the predetermined reference signal on the first predetermined quantity of transmission beams comprises periodically performing the measurement reporting operation in accordance with the measurement results on the first predetermined quantity of transmission beams and a predetermined period.

11. The beam measurement reporting method according to claim 1, wherein the performing the measurement reporting operation in accordance with the measurement result of the predetermined reference signal on the first predetermined quantity of transmission beams comprises:

judging whether a trigger condition for entering a measurement reporting event has been met in accordance with the measurement results on the first predetermined quantity of transmission beams; and when the trigger condition for entering the measurement reporting event has been met, performing the measurement reporting operation.

12. The beam measurement reporting method according to claim 11, further comprising:

judging whether a trigger condition for exiting the measurement report event has been met in accordance with the measurement results on the first predetermined quantity of transmission beams; and when the trigger condition for exiting the measurement report event has been met, ceasing to perform the measurement reporting operation.

13. The beam measurement reporting method according to claim 12, wherein the acquiring the measurement result of the predetermined reference signal on the first predetermined quantity of transmission beams comprises acquiring the measurement result of the first predetermined reference signal on the first predetermined quantity of transmission beams in the serving cell where the terminal side device is located, wherein the trigger condition for entering the measurement reporting event comprises a condition 1: $Mx+Ox-Hys>Thresh1$, and the trigger condition for exiting the measurement reporting event comprises a condition 2: $Mx+Ox+Hys<Thresh1$, where x represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents a first threshold parameter of the measurement reporting event, or wherein the acquiring the measurement result of the predetermined reference signal on the first predetermined quantity of transmission beams comprises acquiring the measurement result of the first predetermined reference signal on the first predetermined quantity of transmission beams in the serving cell where the terminal side device is located, wherein the trigger condition for entering the measurement reporting event comprises a condition 3: $Mx+Ox-Hys>Mref+Oref+Off$, and the trigger condition for exiting the measurement reporting event comprises a condition 4: $Mx+Ox+Hys<Mref+Oref+Off$, where Mx represents the measurement result of the first predetermined reference signal x on the transmission beams in the serving cell, Ox represents a frequency-specific offset for x on the transmission beams in the serving cell, Hys represents a delay parameter of the measurement reporting event, represents a measurement result of a reference x on the transmission beams in the serving cell, Oref represents a frequency-specific offset of the reference x on the transmission beams in the serving cell, and Off represents an offset parameter of the measurement reporting event, or wherein the acquiring the measurement result of the predetermined reference signal on the first predetermined quantity of transmission beams comprises acquiring the measurement result of the first predetermined reference signal on the first predetermined quantity of transmission beams in the serving cell where the terminal side device is located, wherein the trigger condition for entering the measurement reporting event comprises a condition 5: $Mx+Ox+Hys<Thresh1$, and the trigger condition for exiting the measurement reporting event comprises a condition 6: $Mx+Ox-Hys>Thresh1$, where Mx represents the measurement result of the first predetermined reference signal x on the transmission beams in the serving cell, Ox represents a frequency-specific offset for x on the transmission beams in the serving cell, Hys represents a delay parameter of the measurement reporting event, and Thresh1 represents the first threshold parameter of the measurement reporting event, or wherein the acquiring the measurement result of the predetermined reference signal on the first predetermined quantity of transmission beams comprises acquiring the measurement result of the first predetermined reference signal on the first predetermined quantity of transmission beams in the serving cell where the terminal side device is located, and acquiring the measurement result of the second predetermined reference signal on the first predetermined quantity of transmission beams in the neighboring cell of the serving cell, wherein the trigger condition for entering the measurement reporting event comprises a condition 7: $Mn+Ofn+Ocn-Hys>Mp+Ofp+Ocp+Off$, and the trigger condition for exiting the measurement reporting event comprises a condition 8: $Mn+Ofn+Ocn+Hys<Mp+Ofp+Ocp+Off$, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, represents the measurement result of the first predetermined reference signal x on the transmission beams in the serving cell, Ofp represents a frequency-specific offset of x on the transmission beams in the serving cell, Ocp represents a cell-specific offset of x on the transmission beams in the serving cell, and Off represents an offset parameter of the measurement reporting event, or wherein the acquiring the measurement result of the predetermined reference signal on the first predetermined quantity of transmission beams comprises acquiring the measurement result of the second predetermined reference signal on the first predetermined quantity of transmission beams in the neighboring cell of the serving cell, wherein the trigger condition for entering the measurement reporting event comprises a condition 9: $Mn+Ofn+Ocn-Hys>Thresh2$, and the trigger condition for exiting the measurement reporting event comprises a condition 10: $Mn+Ofn+Ocn+Hys<Thresh2$, where Mn represents the measurement result of the second predetermined reference signal y on the transmission beams in the neighboring cell of the serving cell, Ofn represents a frequency-specific offset for y on the transmission beams in the neighboring cell, Ocn represents a cell-specific offset for y on the transmission beams in the neighboring cell, Hys represents a delay parameter of the measurement reporting event, and Thresh2 represents a second threshold parameter of the measurement reporting event, or wherein the acquiring the measurement result of the predetermined reference signal on the first predetermined quantity of transmission beams comprises acquiring the measurement result of the first predetermined reference signal on the first predetermined quantity of transmission beams in the serving cell where the terminal side device is located, and acquiring the measurement result of the second predetermined reference signal on the first predetermined quantity of transmission beams in the neighboring cell of the serving cell, wherein the trigger condition for entering the measurement reporting event comprises a condition 11: Mx+Ox+Hys<Thresh1 and Mn+Ofn+Ocn−Hys>Thresh2, and the trigger condition for exiting the measurement reporting event comprises a condition 12: Mx+Ox−Hys>Thresh1 and Mn+Ofn+Ocn+Hys<Thresh2 where Mx represents the measurement result of the first predetermined reference signal x on the transmission beams in the serving cell, Ox represents the frequency-specific offset for x on the transmission beams in the serving cell, Hys represents a delay parameter of the measurement reporting event, Thresh1 represents the first threshold parameter of the measurement reporting event, Mn represents the measurement result of the second predetermined reference signal y on the transmission beams in the neighboring cell of the serving cell, Ofn represents the frequency-specific offset for y on the transmission beams in the neighboring cell, Ocn represents the cell-specific offset for y on the transmission beams in the neighboring cell, and Thresh2 represents the second threshold parameter of the measurement reporting event.

14. The beam measurement reporting method according to claim 1, wherein the acquiring the measurement result of the predetermined reference signal on the first predetermined quantity of transmission beams comprises acquiring the measurement result of the predetermined reference signal on the first predetermined quantity of transmissions beams received on each reception beam comprised in a reception antenna group of the terminal side device.

15. A terminal side device, comprising a processor, a memory, and a computer program stored in the memory and executed by the processor, wherein the processor is configured to execute the computer program, so as to implement a beam measurement reporting method for a terminal side device, comprising:

acquiring measurement configuration information from a network side device;

determining a first predetermined quantity of transmission beams in a plurality of transmission beams in accordance with the measurement configuration information, the first predetermined quantity of transmission beams being transmission beams to be used by the terminal side device in a connected state to perform predetermined reference signal measurement;

acquiring a measurement result of a predetermined reference signal on the first predetermined quantity of transmission beams; and performing a measurement reporting operation in accordance with the measurement result of the predetermined reference signal on the first predetermined quantity of transmission beams, wherein the acquiring the measurement result of the predetermined reference signal on the first predetermined quantity of transmission beams comprises:

acquiring a measurement result of a first predetermined reference signal on the first predetermined quantity of transmission beams in a serving cell where the terminal side device is located; and/or acquiring a measurement result of a second predetermined reference signal on the first predetermined quantity of transmission beams in a neighboring cell of the serving cell.

16. A non-transitory computer-readable storage medium, storing therein a computer program, wherein the computer program is executed by a processor so as to implement a beam measurement reporting method for a terminal side device, comprising:

acquiring measurement configuration information from a network side device;

determining a first predetermined quantity of transmission beams in a plurality of transmission beams in accordance with the measurement configuration information, the first predetermined quantity of transmission beams being transmission beams to be used by the terminal side device in a connected state to perform predetermined reference signal measurement;

acquiring a measurement result of a predetermined reference signal on the first predetermined quantity of transmission beams; and performing a measurement reporting operation in accordance with the measurement result of the predetermined reference signal on the first predetermined quantity of transmission beams, wherein the acquiring the measurement result of the predetermined reference signal on the first predetermined quantity of transmission beams comprises:

acquiring a measurement result of a first predetermined reference signal on the first predetermined quantity of transmission beams in a serving cell where the terminal side device is located; and/or acquiring a measurement result of a second predetermined reference signal on the first predetermined quantity of transmission beams in a neighboring cell of the serving cell.

17. The terminal side device according to claim 15, wherein when the acquiring the measurement result of the predetermined reference signal on the first predetermined quantity of transmission beams comprises acquiring the measurement result of the first predetermined reference signal on the first predetermined quantity of transmission beams in the serving cell where the terminal side device is located, the performing the measurement reporting operation in accordance with the measurement result of the predetermined reference signal on the first predetermined quantity of transmission beams comprises determining cell quality of the serving cell in accordance with the measurement result of the predetermined reference signal on the first predetermined quantity of transmission beams, and reporting the cell quality of the serving cell.

18. The terminal side device according to claim 17, wherein the determining the cell quality of the serving cell in accordance with the measurement result of the predetermined reference signal on the first predetermined quantity of transmission beams comprises:

acquiring a measurement result of a current-serving transmission beams in the measurement results on the first predetermined quantity of transmission beams, and determining the cell quality of the serving cell in accordance with the measurement result of the currently-serving transmission beam; or calculating the measurement results on the first predetermined quantity of transmission beams in accordance with a predetermined algorithm, and determining the cell quality of the serving cell in accordance with a calculation result; or acquiring measurement results on transmission beams of a first type greater than a first predetermined threshold in the measurement results on the first predetermined quantity of transmission beams, calculating the measurement results on the transmission beams of the first type in accordance with the predetermined algorithm, and determining the cell quality of the serving cell in accordance with a calculation result, wherein the predetermined algorithm comprises a summation, averaging or weighting algorithm.

19. The terminal side device according to claim 15, wherein the performing the measurement reporting operation in accordance with the measurement result of the predetermined reference signal on the first predetermined quantity of transmission beams comprises:

acquiring reporting configuration information from the network side device, the reporting configuration information comprising the quantity of to-be-reported beams configured by the network side device for the terminal side device; and acquiring measurement results on a second predetermined quantity of transmission beams in the measurement results on the first predetermined quantity of transmission beams in accordance with the reporting configuration information, and reporting the measurement results on the second predetermined quantity of transmission beams, wherein the second predetermined quantity is smaller than or equal to the first predetermined quantity.

20. The terminal side device according to claim 19, wherein the performing the measurement reporting operation in accordance with the measurement result of the predetermined reference signal on the first predefined quantity of transmission beams further comprises acquiring a beam identity corresponding to each of the second predetermined quantity of transmission beams, and reporting the beam identity corresponding to each of the second predetermined quantity of transmission beams.

* * * * *